(12) United States Patent
Suemitsu et al.

(10) Patent No.: US 12,194,723 B2
(45) Date of Patent: Jan. 14, 2025

(54) RADIATIVE COOLING DEVICE AND COOLING METHOD

(71) Applicant: Osaka Gas Co., Ltd., Osaka (JP)

(72) Inventors: Masahiro Suemitsu, Osaka (JP); Masayuki Sugimoto, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 225 days.

(21) Appl. No.: 17/914,454

(22) PCT Filed: Mar. 11, 2021

(86) PCT No.: PCT/JP2021/009828
§ 371 (c)(1),
(2) Date: Sep. 26, 2022

(87) PCT Pub. No.: WO2021/193112
PCT Pub. Date: Sep. 30, 2021

(65) Prior Publication Data
US 2023/0118292 A1 Apr. 20, 2023

(30) Foreign Application Priority Data
Mar. 27, 2020 (JP) .................................. 2020-058630

(51) Int. Cl.
*B32B 7/027* (2019.01)
*B32B 7/023* (2019.01)
(Continued)

(52) U.S. Cl.
CPC ............. *B32B 7/027* (2019.01); *B32B 7/023* (2019.01); *B32B 7/12* (2013.01); *B32B 15/082* (2013.01);
(Continued)

(58) Field of Classification Search
CPC B32B 7/027; B32B 7/023; B32B 7/12; B32B 15/082; B32B 27/08; B32B 27/308;
(Continued)

(56) References Cited

U.S. PATENT DOCUMENTS 10,502,505 B2 * 12/2019 Yang ....................... F28F 21/02
2003/0082975 A1 5/2003 Harata et al.
(Continued)

FOREIGN PATENT DOCUMENTS

JP 2003127259 A 5/2003
JP 2018203610 A 12/2018
(Continued)

*Primary Examiner* — Dani Fox
*Assistant Examiner* — Fani Polyzos Boosalis
(74) *Attorney, Agent, or Firm* — The Webb Law Firm

(57) ABSTRACT

A radiative cooling device that is in a state in which a radiative surface is colored is provided. A radiative cooling device CP includes an infrared radiative layer A that radiates infrared light IR from a radiative surface H, a light reflective layer B that is disposed on the side opposite to the radiative surface H with respect to the infrared radiative layer A, and a color portion X. The infrared radiative layer A is a resin material layer J that has a thickness adjusted so as to emit a heat radiation energy greater than an absorbed solar energy in a wavelength range from 8 μm to 14 μm, and the color portion X contains a colorant that absorbs light in the visible range.

16 Claims, 27 Drawing Sheets

(51) Int. Cl.
  *B32B 7/12*     (2006.01)
  *B32B 15/082*   (2006.01)
  *B32B 27/08*    (2006.01)
  *B32B 27/30*    (2006.01)
  *B32B 27/32*    (2006.01)

(52) U.S. Cl.
  CPC ............ *B32B 27/08* (2013.01); *B32B 27/308* (2013.01); *B32B 27/32* (2013.01); *B32B 2250/05* (2013.01); *B32B 2307/412* (2013.01); *B32B 2307/416* (2013.01); *B32B 2311/08* (2013.01)

(58) Field of Classification Search
  CPC ................ B32B 27/32; B32B 2250/05; B32B 2307/412; B32B 2307/416; B32B 2311/08
  See application file for complete search history.

(56) References Cited

U.S. PATENT DOCUMENTS

| | | |
|---|---|---|
| 2015/0338175 A1 | 11/2015 | Raman et al. |
| 2018/0354848 A1 | 12/2018 | Van Overmeere et al. |
| 2021/0024409 A1 | 1/2021 | Suemitsu et al. |

FOREIGN PATENT DOCUMENTS

| | | | | |
|---|---|---|---|---|
| KR | 20220071619 A | * | 11/2020 | ............. F28F 13/18 |
| WO | WO-2020022156 A1 | * | 1/2020 | ............. C03C 17/36 |

\* cited by examiner

Fig.15
| MATERIAL | FILM THICKNESS | MATERIAL TEMPERATURE | AMBIENT TEMPERATURE | RADIATIVE COOLING PERFORMANCE IN DAYTIME |
|---|---|---|---|---|
| SILICONE RUBBER | 1 | 34.4 | 35.1 | YES |
|  | 5 | 32.8 | 34.5 | YES |
|  | 10 | 33.5 | 35.3 | YES |
| FLUOROETHYLENE VINYL ETHER | 5 | 33.6 | 34.2 | YES |
|  | 10 | 33.7 | 35.0 | YES |
|  | 50 | 32.5 | 34.6 | YES |
| MODIFIED OLEFIN | 1 | 37.4 | 35.0 | NO |
|  | 5 | 37.1 | 35.0 | NO |
|  | 10 | 37.3 | 35.4 | NO |
| VINYL CHLORIDE RESIN | 80 | 26.5 | 29.5 | YES |
|  | 300 | 27.4 | 28.2 | YES |
Fig.16
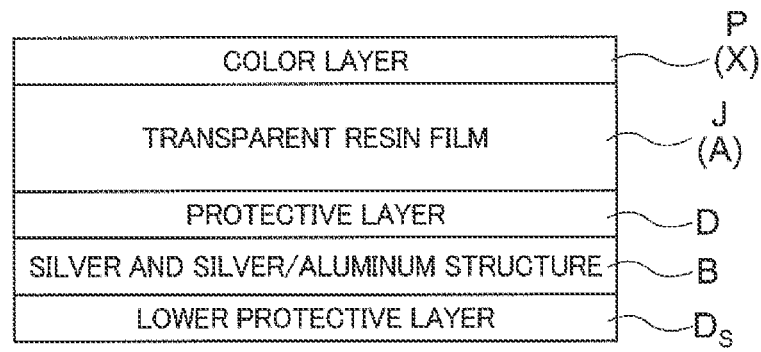
Fig.17
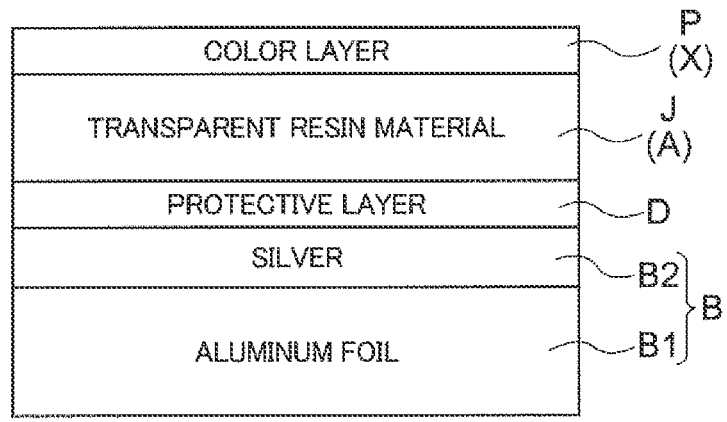

RADIATIVE COOLING DEVICE AND COOLING METHOD

CROSS-REFERENCE TO RELATED APPLICATIONS

This application is the United States national phase of International Application No. PCT/JP2021/009828 filed, Mar. 11, 2021, and claims priority to Japanese Patent Application No. 2020-058630 filed Mar. 27, 2020, the disclosures of which are hereby incorporated by reference in their entirety.

BACKGROUND OF THE INVENTION

Field of the Invention

The present invention relates to a radiative cooling device including an infrared radiative layer that radiates infrared light from a radiative surface and a light reflective layer disposed on a side opposite to the radiative surface with respect to the infrared radiative layer, and a cooling method in which the radiative cooling device is used.

Description of Related Art

The radiative cooling device is used to cool various cooling targets such as a cooling target that is disposed on a side opposite to the infrared radiative layer with respect to the light reflective layer by allowing infrared light radiated from the radiative surface of the infrared radiative layer to be transmitted through an atmospheric window (e.g., a wavelength range from 8 μm to 14 μm in which infrared light is transmitted well through the atmosphere), for example.

The light reflective layer reflects light (visible light, ultraviolet light, infrared light) transmitted through the infrared radiative layer and causes the light to be radiated from the radiative surface. This avoids a situation in which the light (visible light, ultraviolet light, infrared light) transmitted through the infrared radiative layer is projected onto the cooling target and the cooling target is heated.

In addition to light transmitted through the infrared radiative layer, infrared light radiated from the infrared radiative layer toward the light reflective layer is also reflected by the light reflective layer toward the infrared radiative layer, but in the following description, the light reflective layer is described as being provided for the purpose of reflecting light (visible light, ultraviolet light, infrared light) transmitted through the infrared radiative layer.

As a conventional example of such a radiative cooling device, there is a radiative cooling device including an infrared radiative layer that is constituted by glass (optical glass) or a layered body constituted by a $SiO_2$ layer, a MgO layer, and a $Si_3N_4$ layer, and a light reflective layer that is constituted by a diffusion reflection body or a multilayer body obtained by stacking a metal layer made of silver and multiple layers constituted by alternately arranged $TiO_2$ layers and $SiO_2$ layers (see Patent Document 1, for example).

PATENT DOCUMENTS

Patent Document 1: US 2015/0338175A
Patent Document 2: WO 2020/022156

SUMMARY OF THE INVENTION

A radiative cooling device is configured so as to have a high reflectance for a wavelength range (e.g., 400 nm to 1800 nm) in which the intensity of solar energy is high in the state in which the infrared radiative layer and the light reflective layer are stacked on each other.

That is, the infrared radiative layer has a high transmittance for the wavelength range in which the intensity of solar energy is high, but the light reflective layer is configured so as to have a high reflectance so that light transmitted through the infrared radiative layer is sufficiently reflected by the light reflective layer.

The wavelength range (e.g., 400 nm to 1800 nm) in which the intensity of solar energy is high includes the range of visible light (400 nm to 800 nm). Since the light reflective layer is configured to reflect light in the visible range at a high reflectance, the radiative cooling device looks like a mirror surface, for example, and does not appear to be colored when viewed from the radiative surface side of the infrared radiative layer.

However, in order to improve design, it is desired that the radiative cooling device appears to be colored to various colors such as blue, pink, etc., when viewed from the radiative surface side of the infrared radiative layer.

That is, it is envisaged that the radiative cooling device is installed and used on a roof of a house or a roof of an automobile, for example, and in such a case, sometimes it is desired that the radiative cooling device appears to be colored when viewed from the radiative surface side of the infrared radiative layer so that the color of the radiative cooling device viewed from the radiative surface side of the infrared radiative layer matches the color of surroundings, for example.

In the following description, the state in which the radiative cooling device appears to be colored when viewed from the radiative surface side of the infrared radiative layer will be simply referred to as a "state in which the radiative surface is colored".

In a radiative cooling device described in Patent Document 2, a light reflective layer is constituted by a laminate of a first metal layer, a transparent dielectric layer, and a second metal layer. With this light reflective layer, a state in which the radiative surface is colored is realized. However, the light reflective layer has a complex structure and a relatively high cost is required for its production. In this point, there is room for improvement in the radiative cooling device described in Patent Document 1.

The present invention was made in view of the above circumstances and has an object of providing a radiative cooling device that is in a state in which the radiative surface is colored, at a low cost.

A radiative cooling device according to the present invention is characterized by including: an infrared radiative layer configured to radiate infrared light from a radiative surface; a light reflective layer disposed on a side opposite to the radiative surface with respect to the infrared radiative layer; and a color portion, wherein the infrared radiative layer is a resin material layer that has a thickness adjusted so as to emit a heat radiation energy greater than an absorbed solar energy in a wavelength range from 8 μm to 14 μm, and the color portion contains a colorant that absorbs light in the visible range.

That is, sunlight incident on the radiative surface of the resin material layer, which is the infrared radiative layer, is transmitted through the resin material layer, and then reflected by the light reflective layer disposed on the side opposite to the radiative surface with respect to the resin material layer, and released from the radiative surface to the outside of the system.

Note that, when the description of the present specification simply refers to light, the concept of the light encompasses ultraviolet light (ultraviolet rays), visible light, and infrared light. When these are described in terms of the wavelength of light, which is electromagnetic waves, the light encompasses electromagnetic waves having wavelengths of 10 nm to 20000 nm (electromagnetic waves having wavelengths of 0.01 μm to 20 μm).

Also, heat conducted (input) to the radiative cooling device is converted to infrared rays in the resin material layer and released from the radiative surface to the outside of the system.

As described above, with the above configuration, it is possible to reflect sunlight emitted toward the radiative cooling device and also radiate, as infrared light, heat conducted to the radiative cooling device (e.g., heat conducted from the atmosphere or a cooling target that is cooled by the radiative cooling device) toward the outside of the system.

Moreover, the resin material layer has a thickness adjusted so as to emit a heat radiation energy greater than an absorbed solar energy in the wavelength range from 8 μm to 14 μm. Therefore, the radiative cooling device can exhibit a cooling function even under solar radiation in the daytime.

Additionally, the radiative cooling device includes the color portion, and therefore, the color portion of the radiative cooling device appears to be colored when the radiative cooling device is viewed from the radiative surface side of the infrared radiative layer. Also, the color portion contains a colorant that absorbs light in the visible range. Therefore, the color portion can be formed at a low cost. That is, according to the present invention, it is possible to provide a radiative cooling device that is in a state in which the radiative surface is colored, at a low cost.

In another characteristic configuration of the radiative cooling device of the present invention, the colorant has an absorption peak of visible light in a wavelength range from 350 nm to 850 nm.

According to this characteristic configuration of the radiative cooling device of the present invention, the colorant has an absorption peak of visible light in the wavelength range from 350 nm to 850 nm and the color portion is in a colored state. That is, according to the present invention, it is possible to provide a radiative cooling device that is in a state in which the radiative surface is colored, at a low cost.

In another characteristic configuration of the radiative cooling device of the present invention, a resin material forming the resin material layer is selected from resins that have any one or two or more of a carbon-fluorine bond, a siloxane bond, a carbon-chlorine bond, a carbon-oxygen bond, an ether bond, an ester bond, and a benzene ring.

That is, as the resin material forming the resin material layer, it is possible to use a colorless resin material that has any one or two or more of a carbon-fluorine bond (C—F), a siloxane bond (Si—O—Si), a carbon-chlorine bond (C—Cl), a carbon-oxygen bond (C—O), an ether bond (R—COO—R), an ester bond (C—O—C), and a benzene ring.

According to Kirchhoff's law, the emissivity ($\varepsilon$) is equal to the absorptivity (A). The absorptivity (A) can be determined from an absorption coefficient (a) and the following expression 1.

$$A = 1 - \exp(-\alpha t) \quad \text{(expression 1)}$$

Note that t represents a film thickness.

That is, by increasing the thickness of the resin material layer, it is possible to obtain a large amount of heat radiation in a wavelength band in which the absorption coefficient is large. In a case where radiative cooling is performed outdoors, it is preferable to use a material that has a large absorption coefficient in the wavelength band of the atmospheric window, which is from 8 μm to 14 μm. Also, in order to suppress absorption of sunlight, it is preferable to use a material that does not have an absorption coefficient or has a small absorption coefficient in a wavelength range from 0.3 μm to 4 μm, and particularly from 0.4 μm to 2.5 μm. As can be understood from the relational expression 1 of the absorption coefficient and the absorptivity, the absorptivity (emissivity) varies according to the film thickness of the resin material layer.

In order to make the temperature lower than the temperature of the surrounding atmosphere through radiative cooling under solar radiation, it is possible to create a state in which almost no sunlight is absorbed but a large amount of heat is radiated in the atmospheric window, i.e., output of radiative cooling is greater than input of sunlight, by selecting, as the resin material forming the resin material layer, a material that has a large absorption coefficient in the wavelength band of the atmospheric window and almost no absorption coefficient in the wavelength band of sunlight and by adjusting the film thickness of the resin material layer.

The following is an additional description of absorption spectrums of resin materials that can be used to form the resin material layer.

As for the carbon-fluorine bond (C—F), absorption coefficients of CHF and $CF_2$ are widely spread in the wide wavelength band from 8 μm to 14 μm, which is the atmospheric window, and an absorption coefficient at 8.6 μm is particularly large. Regarding the wavelength band of sunlight, there is no noticeable absorption coefficient in the wavelength range from 0.3 μm to 2.5 μm in which the energy is high.

Examples of resin materials that have a C—F bond include:
polytetrafluoroethylene (PTFE), which is a fully fluorinated resin;
polychlorotrifluoroethylene (PCTFE), polyvinylidene fluoride (PVDF), and polyvinyl fluoride (PVF), which are partially fluorinated resins;
a perfluoroalkoxy fluorocarbon resin (PFA), which is a fluorinated resin copolymer;
a tetrafluoroethylene-hexafluoropropylene copolymer (FEP);
an ethylene-tetrafluoroethylene copolymer (ETFE); and
an ethylene-chlorotrifluoroethylene copolymer (ECTFE).

When polyvinylidene fluoride (PVDF) is taken as a representative example, bond energies of a C—C bond, a C—H bond, and a C—F bond in the basic structural unit are 4.50 eV, 4.46 eV, and 5.05 eV. These energies correspond to a wavelength of 0.275 μm, a wavelength of 0.278 μm, and a wavelength of 0.246 μm, respectively, and the resin absorbs light having a wavelength shorter than these wavelengths.

Since the sunlight spectrum includes only wavelengths longer than 0.300 μm, when a fluorocarbon resin is used, the resin absorbs almost no ultraviolet rays, visible rays, and near-infrared rays of sunlight.

Note that ultraviolet rays are defined as light having a wavelength shorter than 0.400 μm, visible rays are defined as light in a wavelength range from 0.400 μm to 0.800 μm, near-infrared rays are defined as light in a wavelength range from 0.800 μm to 3 μm, mid-infrared rays are defined as light in a wavelength range from 3 µm to 8 µm, and far-infrared rays are defined as light having a wavelength longer than 8 µm.

Examples of resin materials that have a siloxane bond (Si—O—Si) include silicone rubber and a silicone resin. In the cases of these resins, a large absorption coefficient for stretching of C—Si bonds appears broadly around a wavelength of 13.3 µm, an absorption coefficient for out-of-plane bending (wagging) of $CSiH_2$ appears broadly around a wavelength of 10 µm, and an absorption coefficient for in-plane bending (scissoring) of $CSiH_2$ slightly appears in the vicinity of a wavelength of 8 µm. As described above, these resins have a large absorption coefficient in the atmospheric window. Regarding the ultraviolet range, bond energy of Si—O—Si constituting the main chain is 4.60 eV, which corresponds to a wavelength of 0.269 µm, and these resins absorb light having a wavelength shorter than 0.269 µm. Since the sunlight spectrum includes only wavelengths longer than 0.300 µm, when a resin having a siloxane bond is used, the resin absorbs almost no ultraviolet rays, visible rays, and near-infrared rays of sunlight.

As for the carbon-chlorine bond (C—Cl), an absorption coefficient for stretching vibration of C—Cl appears around a wavelength of 12 µm over a wide range with a half width of 1 µm or more.

Examples of resin materials that have a carbon-chlorine bond (C—Cl) include polyvinyl chloride (PVC). In the case of polyvinyl chloride, an absorption coefficient for bending vibration of C—H in an alkene contained in the main chain appears at a wavelength of about 10 µm under the influence of electron-withdrawing of chlorine. That is, the resin can radiate a large amount of heat in the wavelength band of the atmospheric window. Note that bond energy between carbon and chlorine in an alkene is 3.28 eV, which corresponds to a wavelength of 0.378 µm, and the resin absorbs light having a wavelength shorter than 0.378 µm. That is, ultraviolet rays in sunlight are absorbed, but almost no light in the visible range is absorbed.

The ether bond (R—COO—R) and the ester bond (C—O—C) have absorption coefficients in a wavelength range from 7.8 µm to 9.9 µm. As for a carbon-oxygen bond included in the ester bond and the ether bond, a large absorption coefficient appears in a wavelength range from 8 µm to 10 µm.

When a benzene ring is introduced into a side chain of a hydrocarbon resin, absorption appears broadly in a wavelength range from 8.1 µm to 18 µm due to vibration of the benzene ring itself and vibration of surrounding elements under the influence of the benzene ring.

Examples of resins that have these bonds include a polymethyl methacrylate resin, an ethylene terephthalate resin, polytrimethylene terephthalate, polybutylene terephthalate, polyethylene naphthalate, and polybutylene naphthalate. For example, bond energy of a C—C bond in methyl methacrylate is 3.93 eV, which corresponds to a wavelength of 0.315 µm, and methyl methacrylate absorbs sunlight having a wavelength shorter than 0.315 µm, but absorbs almost no light in the visible range.

The resin material layer may be any of a single-layer film made of a single resin material, a multilayer film made of a plurality of resin materials, a single-layer film made of a blend of a plurality of resin materials, and a multilayer film made of blends of a plurality of resin materials, as long as resin materials forming the resin material layer have the above-described characteristics of the emissivity and the absorptivity. Note that a blend encompasses copolymers such as an alternating copolymer, a random copolymer, a block copolymer, and a graft copolymer, and a modified product obtained by substituting a side chain.

In short, according to the above-described characteristic configuration of the radiative cooling device of the present invention, it is possible to create a state in which output of radiative cooling is greater than input of sunlight.

In another characteristic configuration of the radiative cooling device of the present invention, a resin material forming the resin material layer contains at least one selected from a vinyl chloride resin, a vinylidene chloride resin, polyvinyl fluoride, polyvinylidene fluoride, a polymethyl methacrylate resin, a resin that contains siloxane as a main component, a fluorocarbon resin, silicone rubber, and a silicone resin.

According to this characteristic configuration of the radiative cooling device of the present invention, the resin material forming the resin material layer is any of the above-listed resins, and therefore, it is possible to create a state in which output of radiative cooling is greater than input of sunlight.

In another characteristic configuration of the radiative cooling device of the present invention, the light reflective layer is constituted by silver or a silver alloy.

According to this characteristic configuration of the radiative cooling device of the present invention, the light reflective layer can efficiently reflect sunlight, and thus it is possible to suppress absorption of solar energy and allow the resin material layer to favorably perform radiative cooling.

In another characteristic configuration of the radiative cooling device of the present invention, the radiative cooling device further includes a protective layer that is disposed between the resin material layer and the light reflective layer, and the protective layer is constituted by a polyolefin based resin, an ethylene terephthalate resin, or an acrylic resin.

According to this characteristic configuration of the radiative cooling device of the present invention, the protective layer is constituted by a polyolefin based resin, an ethylene terephthalate resin, or an acrylic resin. Therefore, it is possible to suppress discoloration of silver or a silver alloy constituting the light reflective layer even under solar radiation in the daytime, and accordingly, the radiative cooling device can exhibit a cooling function even under solar radiation in the daytime while sunlight is appropriately reflected by the light reflective layer.

Furthermore, the protective layer is formed from a resin material having high flexibility, and accordingly the radiative cooling device can be made flexible.

In another characteristic configuration of the radiative cooling device of the present invention, the radiative cooling device further includes a joining layer that joins the protective layer and the resin material layer, and the joining layer is constituted by a urethane resin, an acrylic resin, or an ethylene vinyl acetate resin.

That is, the resin material layer and the protective layer are joined by the joining layer constituted by an adhesive agent or a pressure-sensitive adhesive agent. Accordingly, it is possible to favorably obtain a state where the resin material layer, the protective layer, and the light reflective layer are stacked on each other by forming the light reflective layer and the protective layer in a stacked state and joining the resin material layer, which has been separately formed, to the protective layer using the joining layer.

In another characteristic configuration of the radiative cooling device of the present invention, the color portion constitutes a portion of the joining layer or the entire joining layer.

It is possible to form the joining layer (a portion or the entirety thereof) as the color portion at a low cost by adding a colorant that absorbs light in the visible range to the material of the joining layer. In short, according to this characteristic configuration of the radiative cooling device of the present invention, it is possible to provide a radiative cooling device that is in a state in which the radiative surface is colored, at a low cost.

In another characteristic configuration of the radiative cooling device of the present invention, the color portion is a layer that is provided between the joining layer and the protective layer or between the joining layer and the resin material layer.

It is possible to provide the color portion at a low cost by providing a layer-between the joining layer and the protective layer or between the joining layer and the resin material layer and adding a colorant that absorbs light in the visible range to the material of the layer. In short, according to this characteristic configuration of the radiative cooling device of the present invention, it is possible to provide a radiative cooling device that is in a state in which the radiative surface is colored, at a low cost.

In another characteristic configuration of the radiative cooling device of the present invention, the color portion is a layer that is disposed on the same side as the radiative surface with respect to the infrared radiative layer.

It is possible to provide the color portion at a low cost by providing a layer-on the same side as the radiative surface with respect to the infrared radiative layer and adding a colorant that absorbs light in the visible range to the material of the layer. In short, according to this characteristic configuration of the radiative cooling device of the present invention, it is possible to provide a radiative cooling device that is in a state in which the radiative surface is colored, at a low cost.

In another characteristic configuration of the radiative cooling device of the present invention, the color portion constitutes a portion of the infrared radiative layer or the entire infrared radiative layer.

It is possible to form the infrared radiative layer (a portion or the entirety thereof) as the color portion at a low cost by adding a colorant that absorbs light in the visible range to the material of the infrared radiative layer. In short, according to this characteristic configuration of the radiative cooling device of the present invention, it is possible to provide a radiative cooling device that is in a state in which the radiative surface is colored, at a low cost.

In another characteristic configuration of the radiative cooling device of the present invention, the colorant contains at least one selected from an azo compound, a quinone compound, a triarylmethane compound, a cyanine compound, a phthalocyanine compound, an indigo compound, and a porphyrin compound.

The above-listed colorants are available at low costs. In short, according to this characteristic configuration of the radiative cooling device of the present invention, it is possible to provide a radiative cooling device that is in a state in which the radiative surface is colored, at a low cost.

In another characteristic configuration of the radiative cooling device of the present invention, a colorant content that is a value calculated by dividing a total amount of the colorant contained in the color portion by an area of the entire radiative surface is less than 0.1185 g/m².

When the colorant content is less than 0.1185 g/m², the amount of heat input from sunlight to the radiative cooling device is smaller than the amount of heat output through heat radiation, and therefore, cooling can be performed efficiently. In short, according to this characteristic configuration of the radiative cooling device of the present invention, it is possible to provide a radiative cooling device that is in a state in which the radiative surface is colored while avoiding a reduction in radiative cooling performance that is caused by absorption of sunlight, as far as possible.

In another characteristic configuration of the radiative cooling device of the present invention, the radiative cooling device further includes a hard coat layer at an outermost position on a side opposite to the light reflective layer with respect to the infrared radiative layer.

According to this characteristic configuration of the radiative cooling device of the present invention, the hard coat layer is provided, and thus it is possible to suppress damage to the infrared radiative layer and the color portion.

In another characteristic configuration of the radiative cooling device of the present invention, the hard coat layer is constituted by an acrylic resin.

According to this characteristic configuration of the radiative cooling device of the present invention, the hard coat layer is constituted by an acrylic resin, which is relatively hard, and therefore, it is possible to effectively suppress damage to the infrared radiative layer and the color portion.

A cooling method according to the present invention is characterized by being performed using the radiative cooling device described above and including: disposing the radiative cooling device such that the radiative surface of the infrared radiative layer faces the sky; and allowing the radiative surface to radiate infrared light.

With this configuration, infrared light that is released from the radiative surface to the outside of the system can be emitted toward the sky, i.e., the universe. Furthermore, it is possible to suppress absorption of sunlight and improve cooling performance.

In short, according to the characteristic configuration of the cooling method of the present invention, it is possible to cool a cooling target using the radiative cooling device that is in a state in which the radiative surface is colored.

BRIEF DESCRIPTION OF THE DRAWINGS

FIG. 15 is a table showing experimental results.

FIG. 16 is a diagram showing a specific configuration of the radiative cooling device.

FIG. 17 is a diagram showing a specific configuration of the radiative cooling device.

DESCRIPTION OF THE INVENTION

The following describes an embodiment of the present invention based on the drawings. [Basic Configuration of Radiative Cooling Device]

Figure 1:
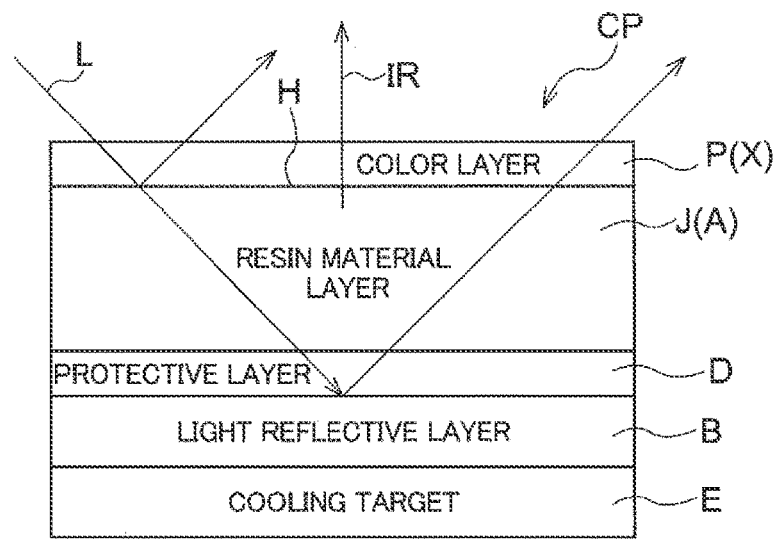
FIG. 1 is a diagram showing a basic configuration of a radiative cooling device.

As shown in FIG. 1, a radiative cooling device CP includes an infrared radiative layer A that radiates infrared light IR from a radiative surface H, a light reflective layer B that is disposed on the side opposite to the radiative surface H with respect to the infrared radiative layer A, and a color portion X. In the present embodiment, the color portion X is a color layer P. The color layer P is a layer-shaped portion and is disposed on the same side as the radiative surface H with respect to the infrared radiative layer A. In the present embodiment, the radiative cooling device CP includes a protective layer D disposed between the infrared radiative layer A and the light reflective layer B. The color layer P, the infrared radiative layer A, the protective layer D, and the light reflective layer B are stacked on each other. The radiative cooling device CP has a film shape as a whole.

That is, the radiative cooling device CP is configured as a radiative cooling film.

The color portion X contains a colorant that absorbs light in the visible range. In the present embodiment, the colorant has an absorption peak of visible light in a wavelength range from 350 nm to 850 nm. Owing to the color portion X, the radiative cooling device CP is in a state in which the radiative surface H is colored. The color portion X may contain a single colorant or two or more colorants.

Figure 32:
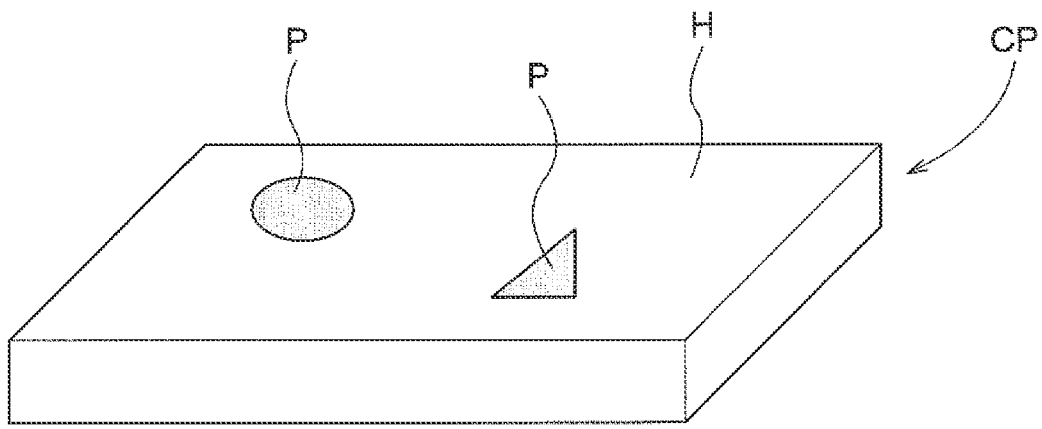
FIG. 32 is a diagram showing a specific configuration of the radiative cooling device.

The color layer P may be provided over the entire radiative surface H of a resin material layer J, or may cover a portion of the radiative surface H as shown in FIG. 32. A configuration is also possible in which a character, a symbol, a pattern, or the like is drawn with the color layer P.

The light reflective layer B reflects light L, such as sunlight, that has been transmitted through the color layer P, the infrared radiative layer A, and the protective layer D, and has reflection properties satisfying a reflectance of 90% or more for light having a wavelength within a range from 400 nm to 500 nm and a reflectance of 96% or more for light having a wavelength longer than 500 nm.

Figure 10:
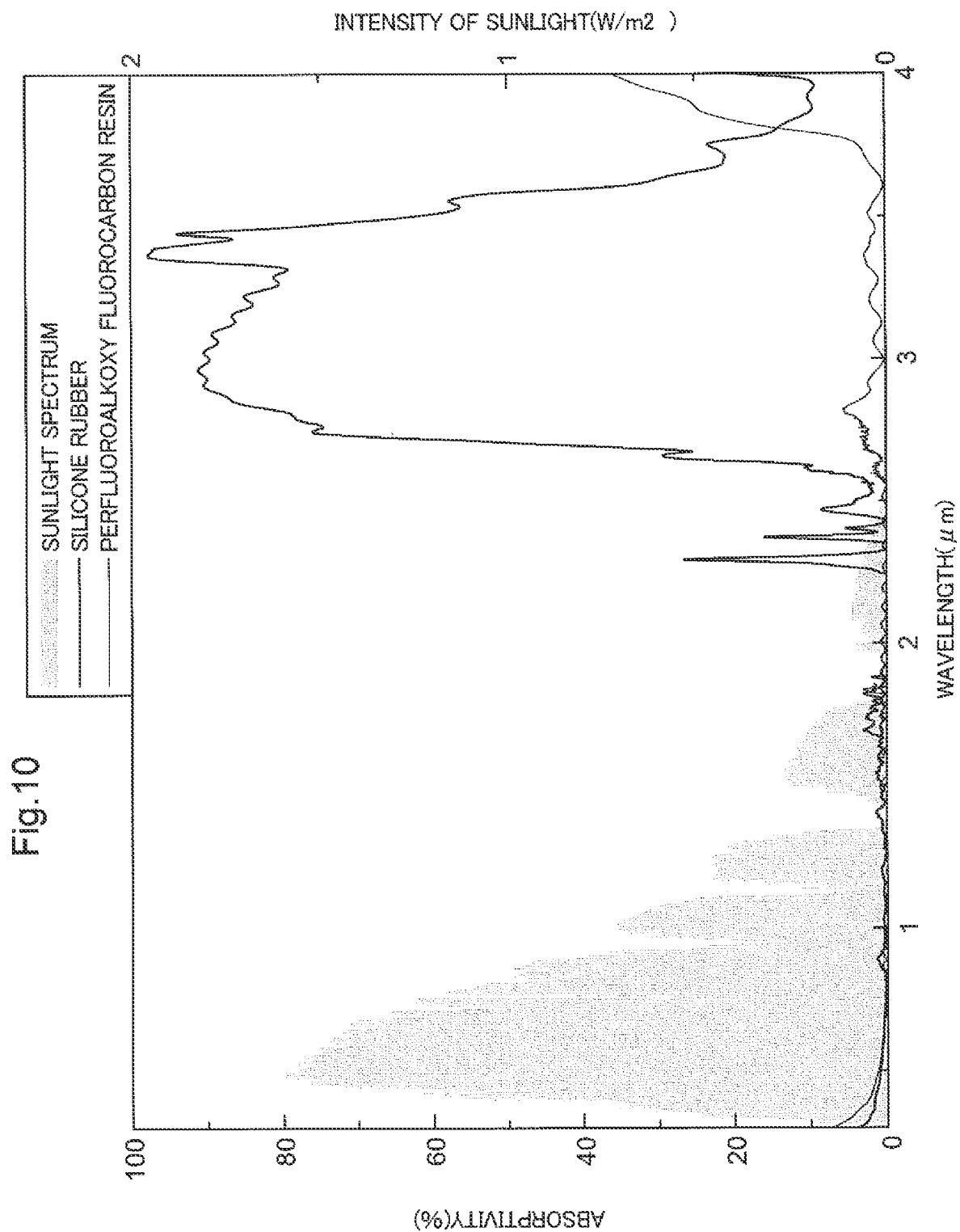
FIG. 10 is a diagram showing absorptivity spectrums of silicone rubber and a perfluoroalkoxy fluorocarbon resin.

As shown in FIG. 10, the spectrum of sunlight spans from a wavelength of 300 nm to a wavelength of 4000 nm, and the intensity increases as the wavelength increases from 400 nm, and the intensity is particularly high in a wavelength range from 500 nm to 1800 nm.

In the present embodiment, light L encompasses ultraviolet light (ultraviolet rays), visible light, and infrared light. When these are described in terms of the wavelength of light, which is electromagnetic waves, the light L encompasses electromagnetic waves having wavelengths of 10 nm to 20000 nm (electromagnetic waves having wavelengths of 0.01 µm to 20 µm). In the present specification, the wavelength range of ultraviolet light (ultraviolet rays) is taken as a range from 300 nm to 400 nm.

Since the light reflective layer B exhibits the reflection properties satisfying a reflectance of 90% or more for light having a wavelength within a range from 400 nm to 500 nm and a reflectance of 96% or more for light having a wavelength longer than 500 nm, solar energy absorbed by the light reflective layer B of the radiative cooling device CP (radiative cooling film) can be suppressed to 5% or less. That is, solar energy absorbed at the time of meridian transit in summer can be suppressed to about 50 W, and radiative cooling can be favorably performed by the resin material layer J. Note that, in the present specification, the spectrum of sunlight is in accordance with the standard of AM1.5G, unless otherwise stated.

The light reflective layer B is constituted by silver or a silver alloy or has a layerd structure constituted by silver or a silver alloy disposed adjacent to the protective layer D and aluminum or an aluminum alloy disposed apart from the protective layer D, and is flexible. Details of the light reflective layer B will be described later.

The infrared radiative layer A is configured as a resin material layer J that has a thickness adjusted so as to emit heat radiation energy greater than absorbed solar energy in a wavelength band from 8 µm to 14 µm. Details of the infrared radiative layer A will be described later.

Accordingly, the radiative cooling device CP is configured such that the radiative surface H of the infrared radiative layer A reflects a portion of light L incident on the radiative cooling device CP and the light reflective layer B reflects a portion (e.g., sunlight) of light L incident on the radiative cooling device CP and transmitted through the resin material layer J and the protective layer D so that the reflected light goes out from the radiative surface H to the outside.

The radiative cooling device CP is also configured to cool a cooling target E that is disposed on the side opposite to the resin material layer J with respect to the light reflective layer B by converting heat input from the cooling target E to the radiative cooling device CP (e.g., heat conducted from the cooling target E) to infrared light IR in the resin material layer J and radiating the infrared light IR from the resin material layer J.

That is, the radiative cooling device CP is configured to reflect light L emitted toward the radiative cooling device CP and radiate heat conducted to the radiative cooling device CP (e.g., heat conducted from the atmosphere or the cooling target E) as infrared light IR to the outside.

Also, the radiative cooling device CP (radiative cooling film) is configured to be flexible due to the resin material layer J, the protective layer D, and the light reflective layer B being flexible.

In addition, the radiative cooling device CP is used to perform a cooling method. The cooling method includes disposing the radiative cooling device CP such that the radiative surface H of the infrared radiative layer A faces the sky, and allowing the radiative surface H to radiate infrared light IR. The cooling target E is cooled through radiation of the infrared light IR.

[Overview of Resin Material Layer]

The absorptivity and the emissivity (light emissivity) of a resin material that forms the resin material layer J vary according to the thickness of the resin material layer J. Therefore, the thickness of the resin material layer J needs to be adjusted so as not to absorb sunlight as far as possible and so as to radiate a large amount of heat in the wavelength band of so-called atmospheric window (wavelength band from 8 µm to 14 µm).

Specifically, from the viewpoint of absorptivity for sunlight, the thickness of the resin material layer J needs to be adjusted such that a wavelength average absorptivity in a wavelength range from 0.4 µm to 0.5 µm is 13% or less, a wavelength average absorptivity in a wavelength range from 0.5 µm to 0.8 µm is 4% or less, a wavelength average absorptivity in a wavelength range from 0.8 µm to 1.5 µm is 1% or less, a wavelength average absorptivity in a wavelength range from 1.5 µm to 2.5 µm is 40% or less, and a wavelength average absorptivity in a wavelength range from 2.5 µm to 4 µm is 100% or less.

In the case of such an absorptivity distribution, the absorptivity for sunlight is 10% or less, which corresponds to an energy of 100 W or less Note that the wavelength average absorptivity in the wavelength range from 0.4 µm to 0.5 µm refers to an average value of absorptivities at respective wavelengths within the range from 0.4 µm to 0.5 µm. The same applies to the wavelength average absorptivity in the wavelength range from 0.5 µm to 0.8 µm, the wavelength average absorptivity in the wavelength range from 0.8 µm to 1.5 µm, and the wavelength average absorptivity in the wavelength range from 1.5 µm to 2.5 µm. Also, similar descriptions including descriptions of emissivity refer to similar average values.

The absorptivity of a resin material increases as the film thickness of the resin material is increased, as described later. When a film of the resin material is made thick, the emissivity in the atmospheric window becomes approximately 1, and the amount of heat radiated to the universe at that time is 125 W/m² to 160 W/m². The amount of sunlight absorbed by the protective layer D and the light reflective layer B is 50 W/m² or less. Cooling progresses if the sum of amounts of sunlight absorbed by the resin material layer J, the protective layer D, and the light reflective layer B is 150 W/m² or less and the atmosphere is in good conditions. As the resin material for forming the resin material layer J, it is preferable to use a resin material that has a small absorptivity in the vicinity of a peak value of the sunlight spectrum as described above.

Also, from the viewpoint of infrared radiation (heat radiation), the thickness of the resin material layer J needs to be adjusted such that a wavelength average emissivity in the wavelength range from 8 µm to 14 µm is 40% or more.

In order to emit heat energy of about 50 W/m² absorbed from sunlight by the protective layer D and the light reflective layer B through heat radiation from the resin material layer J to the universe, the resin material layer J needs to radiate heat more than or equal to the absorbed heat.

For example, when the ambient temperature is 30° C., the maximum heat radiation in the atmospheric window of 8 µm to 14 µm is 200 W/m² (calculated with the emissivity taken as 1). This value can be obtained in an environment in which the air is thin and very dry, such as an environment on a high mountain, in cloudless weather. When compared with a high mountain, the thickness of the atmosphere increases in a lowland, for example, and accordingly, the wavelength band of the atmospheric window becomes narrower and the transmittance decreases. This is said as "the atmospheric window becoming narrower".

Also, the radiative cooling device CP (radiative cooling film) is actually used in a humid environment, and the atmospheric window becomes narrower in such a case as well. In the case where the radiative cooling device is used in a lowland, heat radiation in the atmospheric window band is estimated to be 160 W/m² (calculated with the emissivity taken as 1) at 30° C. under good conditions. Moreover, when there is haze or smog in the sky, as is often the case in Japan, the atmospheric window further becomes narrower and radiation to the universe becomes about 125 W/m².

In view of the foregoing, the radiative cooling device cannot be used in a lowland in the mid-latitude area unless the wavelength average emissivity in the wavelength range from 8 µm to 14 µm is 40% or more (heat radiation intensity in the atmospheric window band is 50 W/m²).

Therefore, when the thickness of the resin material layer J is adjusted so as to fall within the range of optical prescriptions in view of the foregoing, the amount of heat output in the atmospheric window becomes greater than the amount of heat input through absorption of sunlight, and the temperature can be made lower than the ambient temperature through radiative cooling even under solar radiation in an outdoor environment.

[Details of Resin Material]

It is possible to use colorless resin materials that have any of a carbon-fluorine bond (C—F), a siloxane bond (Si—O—Si), a carbon-chlorine bond (C—Cl), a carbon-oxygen bond (C—O), an ester bond (R—COO—R), an ether bond (C—O—C bond), and a benzene ring.

Figure 2:
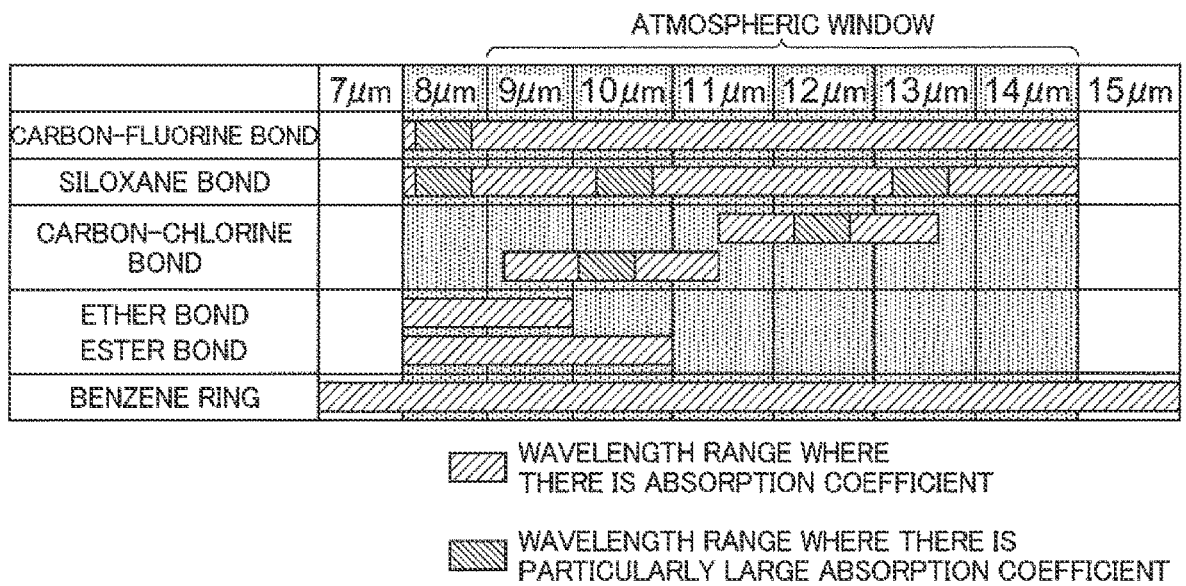
FIG. 2 is a diagram showing a relationship between absorption coefficients of resin materials and wavelength bands.

For each resin material (except for a resin material having a carbon-oxygen bond), FIG. 2 shows a wavelength range in which the resin material has an absorption coefficient in the wavelength band of the atmospheric window.

According to Kirchhoff's law, the emissivity (ε) is equal to the absorptivity (A). The absorptivity can be determined from an absorption coefficient (α) and a relational expression: $A=1-\exp(\alpha t)$ (hereinafter referred to as an absorptivity relational expression). Note that t represents a film thickness.

That is, by adjusting the film thickness of the resin material layer J, it is possible to obtain a large amount of heat radiation in a wavelength band in which the absorption coefficient is large. In a case where radiative cooling is performed outdoors, it is preferable to use a material that has a large absorption coefficient in the wavelength band of the atmospheric window, which is from 8 μm to 14 μm.

Also, in order to suppress absorption of sunlight, it is preferable to use a material that does not have an absorption coefficient or has a small absorption coefficient in a wavelength range from 0.3 μm to 4 μm, and particularly from 0.4 μm to 2.5 μm. As can be understood from the relational expression of the absorption coefficient and the absorptivity, the absorptivity (emissivity) varies according to the film thickness of the resin material.

In order to make the temperature lower than the temperature of the surrounding atmosphere through radiative cooling under solar radiation, it is possible to create a state in which almost no sunlight is absorbed but a large amount of heat is radiated in the atmospheric window, i.e., output of radiative cooling is greater than input of sunlight, by selecting a material that has a large absorption coefficient in the wavelength band of the atmospheric window and almost no absorption coefficient in the wavelength band of sunlight and by adjusting the film thickness.

As for the carbon-fluorine bond (C—F), absorption coefficients of CHF and $CF_2$ are widely spread in the wide wavelength band from 8 μm to 14 μm, which is the atmospheric window, and an absorption coefficient at 8.6 μm is particularly large. Regarding the wavelength band of sunlight, there is no noticeable absorption coefficient in the wavelength range from 0.3 μm to 2.5 μm in which the energy intensity is high.

Examples of resin materials that have a carbon-fluorine bond (C—F) include:
polytetrafluoroethylene (PTFE), which is a fully fluorinated resin;
polychlorotrifluoroethylene (PCTFE), polyvinylidene fluoride (PVDF), and polyvinyl fluoride (PVF), which are partially fluorinated resins;
a perfluoroalkoxy fluorocarbon resin (PFA), which is a fluorinated resin copolymer;
a tetrafluoroethylene-hexafluoropropylene copolymer (FEP);
an ethylene-tetrafluoroethylene copolymer (ETFE); and
an ethylene-chlorotrifluoroethylene copolymer (ECTFE).
Examples of resin materials that have a siloxane bond (Si—O—Si) include silicone rubber and a silicone resin.

In the cases of these resins, a large absorption coefficient for stretching of C—Si bonds appears broadly around a wavelength of 13.3 μm, an absorption coefficient for out-of-plane bending (wagging) of $CSiH_2$ appears broadly around a wavelength of 10 μm, and an absorption coefficient for in-plane bending (scissoring) of $CSiH_2$ slightly appears in the vicinity of a wavelength of 8 μm.

As for the carbon-chlorine bond (C—Cl), an absorption coefficient for stretching vibration of C—Cl appears around a wavelength of 12 μm over a wide range with a half width of 1 μm or more.

Examples of resin materials that have a carbon-chlorine bond include a vinyl chloride resin (PVC) and a vinylidene chloride resin (PVDC). In the case of the vinyl chloride resin, an absorption coefficient for bending vibration of C—H in an alkene contained in the main chain appears at a wavelength of about 10 μm under the influence of electron-withdrawing of chlorine.

The ester bond (R—COO—R) and the ether bond (C—O—C bond) have absorption coefficients in a wavelength range from 7.8 μm to 9.9 μm. As for a carbon-oxygen bond included in the ester bond and the ether bond, a large absorption coefficient appears in a wavelength range from 8 μm to 10 μm.

When a benzene ring is introduced into a side chain of a hydrocarbon resin, absorption appears broadly in a wavelength range from 8.1 μm to 18 μm due to vibration of the benzene ring itself and vibration of surrounding elements under the influence of the benzene ring.

Examples of resins that have these bonds include a methyl methacrylate resin (PMMA), an ethylene terephthalate resin, a trimethylene terephthalate resin, a butylene terephthalate resin, an ethylene naphthalate resin, and a butylene naphthalate resin.

[Consideration on Light Absorption]

The following is consideration on absorption of light in the ultraviolet-visible range, i.e., absorption of sunlight by resin materials having the above-described bonds and functional group. The origin of absorption of ultraviolet light and visible light is transition of electrons that contribute to bonds. Absorption of light in this wavelength range can be found by calculating bond energy.

First, the following considers wavelengths at which resin materials having a carbon-fluorine bond (C—F) have an absorption coefficient in the ultraviolet-visible range. When polyvinylidene fluoride (PVDF) is taken as a representative example, bond energies of a C—C bond, a C—H bond, and a C—F bond in the basic structural unit are 4.50 eV, 4.46 eV, and 5.05 eV. These energies correspond to a wavelength of 0.275 μm, a wavelength of 0.278 μm, and a wavelength of 0.246 μm, respectively, and the resin absorbs light having these wavelengths.

Since the sunlight spectrum includes only wavelengths longer than 0.300 μm, when a fluorocarbon resin is used, the resin absorbs almost no ultraviolet rays, visible rays, and near-infrared rays of sunlight. Note that ultraviolet rays are defined as light having a wavelength shorter than 0.400 μm, visible rays are defined as light in a wavelength range from 0.400 μm to 0.800 μm, near-infrared rays are defined as light in a wavelength range from 0.800 μm to 3 μm, mid-infrared rays are defined as light in a wavelength range from 3 μm to 8 μm, and far-infrared rays are defined as light having a wavelength longer than 8 μm.

Figure 3:
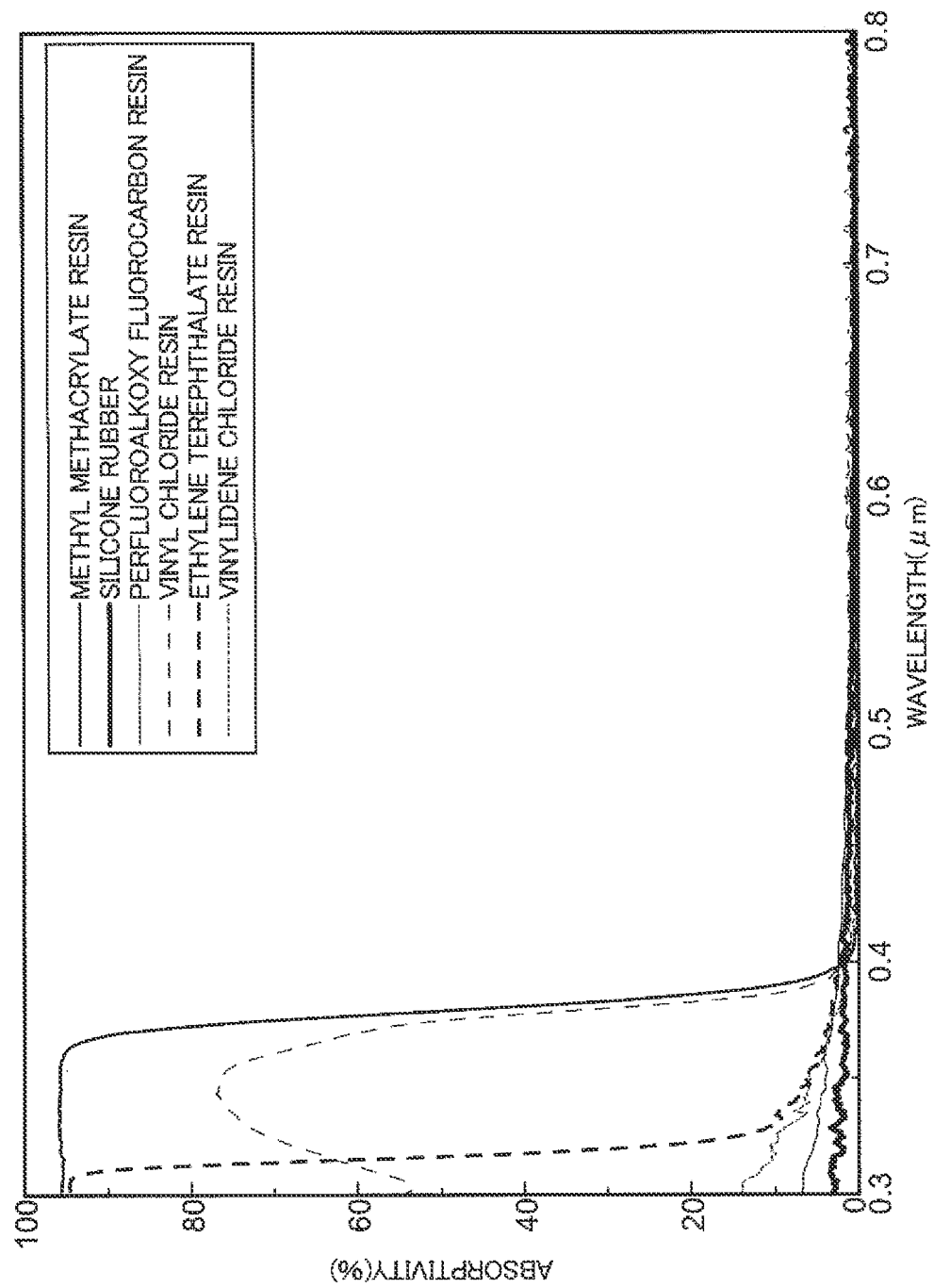
FIG. 3 is a diagram showing a relationship between absorptivities of resin materials and the wavelength.

FIG. 3 shows an absorptivity spectrum of PFA (perfluoroalkoxy fluorocarbon resin) with a thickness of 50 μm in the ultraviolet-visible range. It can be found that PFA has almost no absorptivity in this range. Although a slight increase can be observed in the absorptivity spectrum at wavelengths shorter than 0.4 μm, this increase shows an influence of scattering in the sample used for the measurement, and the absorptivity does not actually increase.

As for absorption by the siloxane bond (Si—O—Si) in the ultraviolet range, bond energy of Si—O—Si constituting the main chain is 4.60 eV, which corresponds to a wavelength of 269 nm. Since the sunlight spectrum includes only wavelengths longer than 0.300 μm, when the siloxane bond constitutes the most part of the resin material, the resin material absorbs almost no ultraviolet rays, visible rays, and near-infrared rays of sunlight.

FIG. 3 shows an absorptivity spectrum of silicone rubber with a thickness of 100 μm in the ultraviolet-visible range. It can be found that silicone rubber has almost no absorptivity in this range. Although a slight increase can be observed in the absorptivity spectrum at wavelengths shorter than 0.4 µm, this increase shows an influence of scattering in the sample used for the measurement, and the absorptivity does not actually increase.

As for the carbon-chlorine bond (C—Cl), bond energy between carbon and chlorine in an alkene is 3.28 eV, which corresponds to a wavelength of 0.378 µm, and therefore, ultraviolet rays in sunlight are absorbed well, but almost no light in the visible range is absorbed.

FIG. 3 shows an absorptivity spectrum of a vinyl chloride resin with a thickness of 100 µm in the ultraviolet-visible range. Light absorption is large at wavelengths shorter than 0.38 µm.

FIG. 3 shows an absorptivity spectrum of a vinylidene chloride resin with a thickness of 100 µm in the ultraviolet-visible range. A slight increase can be observed in the absorptivity spectrum at wavelengths shorter than 0.4 µm.

Examples of resins that have any of an ester bond (R—COO—R), an ether bond (C—O—C bond), and a benzene ring include a methyl methacrylate resin, an ethylene terephthalate resin, a trimethylene terephthalate resin, a butylene terephthalate resin, an ethylene naphthalate resin, and a butylene naphthalate resin. For example, bond energy of a C—C bond in an acrylic resin is 3.93 eV and the resin absorbs sunlight having a wavelength shorter than 0.315 µm, but absorbs almost no light in the visible range.

FIG. 3 shows an absorptivity spectrum of a methyl methacrylate resin with a thickness of 5 mm, as an example of resin materials having the above-described bonds and functional group, in the ultraviolet-visible range. Note that the methyl methacrylate resin described as an example is a commercially available resin in which a benzotriazole ultraviolet absorbing agent is mixed.

Since the thickness is as large as 5 mm, the absorptivity is large even at wavelengths at which the absorption coefficient is small, and light absorption is large at wavelengths shorter than 0.38 µm, which is longer than 0.315 µm.

FIG. 3 shows an absorptivity spectrum of an ethylene terephthalate resin with a thickness of 40 µm, as an example of resin materials having the above-described bonds and functional group, in the ultraviolet-visible range.

As shown in FIG. 3, the absorptivity increases as the wavelength gets closer to 0.315 µm, and the absorptivity sharply increases at the wavelength of 0.315 µm. In the case of the ethylene terephthalate resin as well, when the thickness is increased, the absorptivity becomes large at a wavelength slightly longer than 0.315 µm due to an absorption edge of a C—C bond, and the absorptivity for ultraviolet rays becomes large as is the case with the commercially available methyl methacrylate resin.

The resin material layer J may be any of a single-layer film made of a single resin material, a multilayer film made of a plurality of resin materials, a single-layer film made of a blend of a plurality of resin materials, and a multilayer film made of blends of a plurality of resin materials, as long as resin materials having the above-described characteristics of the emissivity (light emissivity) and the absorptivity are used.

Note that a blend encompasses copolymers such as an alternating copolymer, a random copolymer, a block copolymer, and a graft copolymer, and a modified product obtained by substituting a side chain.

[Emissivity of Silicone Rubber]

Figure 4:
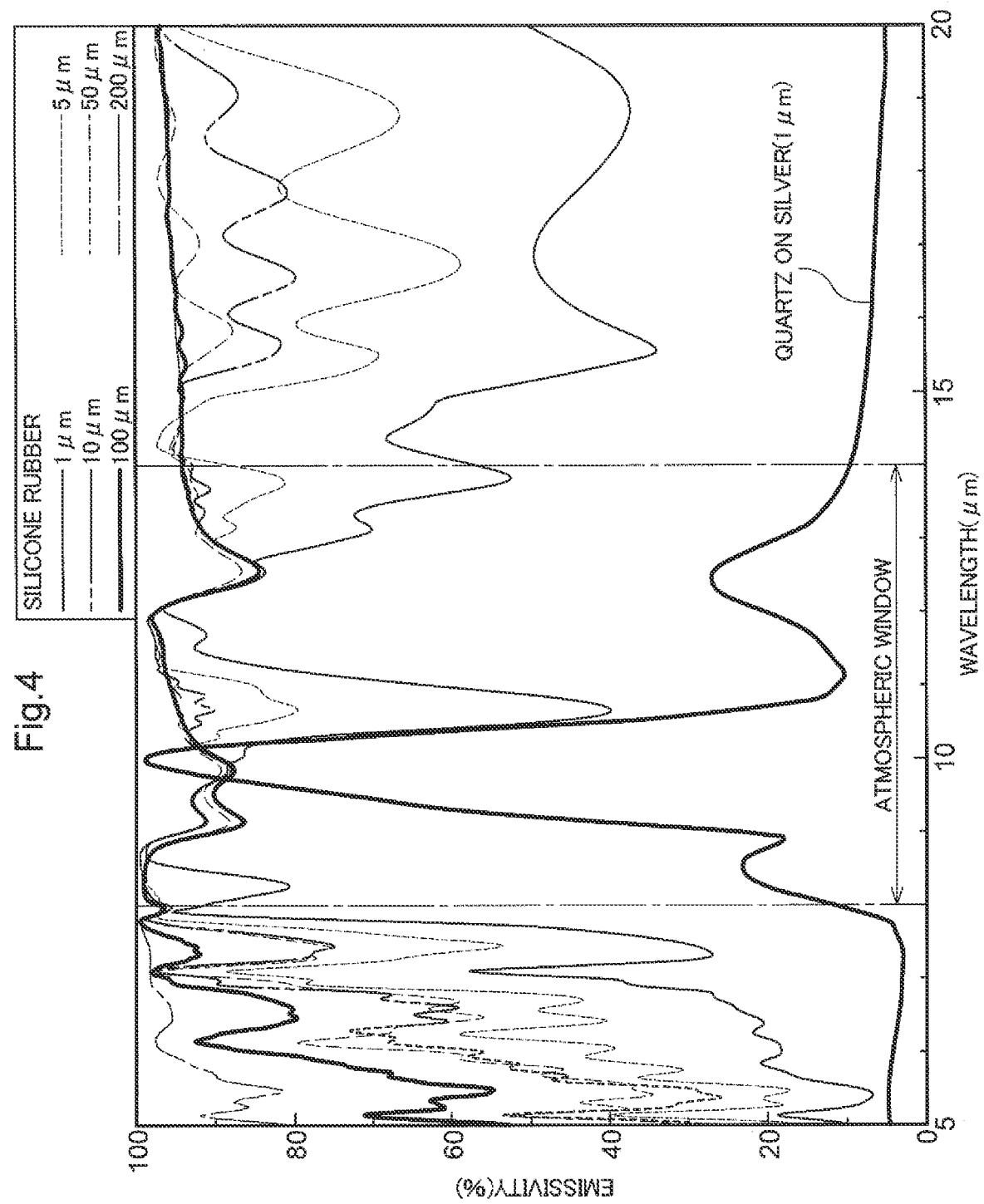
FIG. 4 is a diagram showing an emissivity spectrum of silicone rubber.

FIG. 4 shows an emissivity spectrum of silicone rubber, which has a siloxane bond, in the atmospheric window.

As for silicone rubber, a large absorption coefficient for stretching of C—Si bonds appears broadly around a wavelength of 13.3 µm, an absorption coefficient for out-of-plane bending (wagging) of $CSiH_2$ appears broadly around a wavelength of 10 µm, and an absorption coefficient for in-plane bending (scissoring) of $CSiH_2$ slightly appears in the vicinity of a wavelength of 8 µm.

Under the influence of this, a wavelength average emissivity when the thickness is 1 µm is 80% in the wavelength range from 8 µm to 14 µm and falls within the prescribed range of the wavelength average emissivity of 40% or more. As shown in FIG. 4, the emissivity in the atmospheric window range increases as the film thickness is increased.

FIG. 4 also shows a radiation spectrum of a case where quartz, which is an inorganic material, with a thickness of 1 µm is present on silver. When the thickness is 1 µm, quartz only has a narrow radiation peak in the wavelength range from 8 µm to 14 µm.

When a wavelength average of the heat radiation in the wavelength range from 8 µm to 14 µm is calculated, the emissivity in the wavelength range from 8 µm to 14 µm is 32%, and it is difficult to exhibit radiative cooling properties.

The radiative cooling device CP (radiative cooling film) according to the present invention in which the resin material layer J is used can have radiative cooling properties even if the infrared radiative layer A is thinner than that of conventional technologies in which inorganic materials are used as the light reflective layer B. That is, in a case where the infrared radiative layer A is formed from quartz or TEMPAX glass, which are inorganic materials, radiative cooling properties cannot be obtained if the film thickness of the infrared radiative layer A is 1 µm, but the radiative cooling device CP according to the present invention in which the resin material layer J is used exhibits radiative cooling properties even if the film thickness of the resin material layer J is 1 µm.

[Emissivity of PFA]

Figure 5:
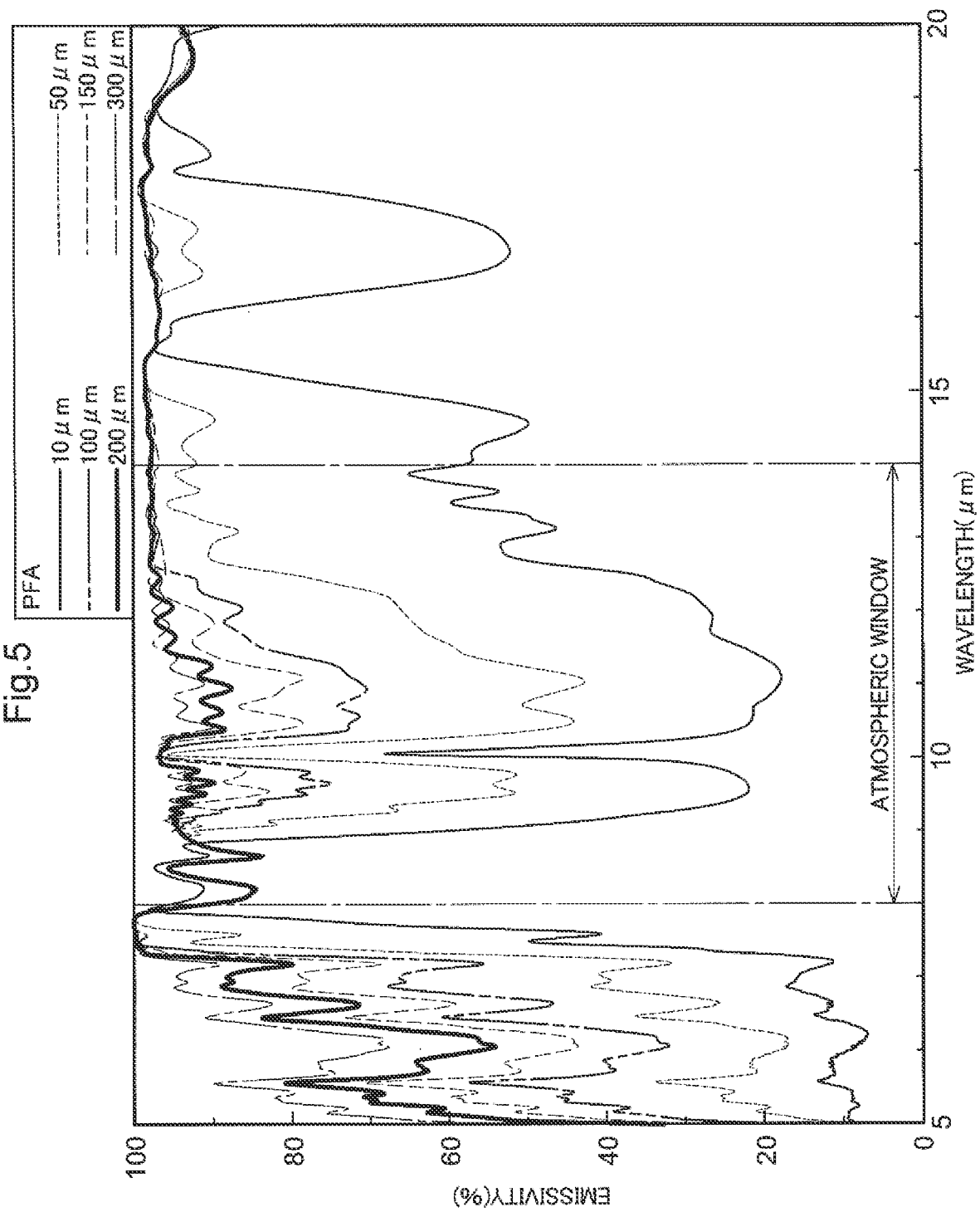
FIG. 5 is a diagram showing an emissivity spectrum of PFA.

FIG. 5 shows the emissivity of a perfluoroalkoxy fluorocarbon resin (PFA), which is a representative example of resins having a carbon-fluorine bond, in the atmospheric window. Absorption coefficients of CHF and $CF_2$ are widely spread in the wide wavelength band from 8 µm to 14 µm, which is the atmospheric window, and an absorption coefficient at 8.6 µm is particularly large.

Under the influence of this, a wavelength average emissivity when the thickness is 10 µm is 45% in the wavelength range from 8 µm to 14 µm and falls within the prescribed range of the wavelength average emissivity of 40% or more. As shown in FIG. 5, the emissivity in the atmospheric window range increases as the film thickness is increased.

[Emissivities of Vinyl Chloride Resin and Vinylidene Chloride Resin]

Figure 6:
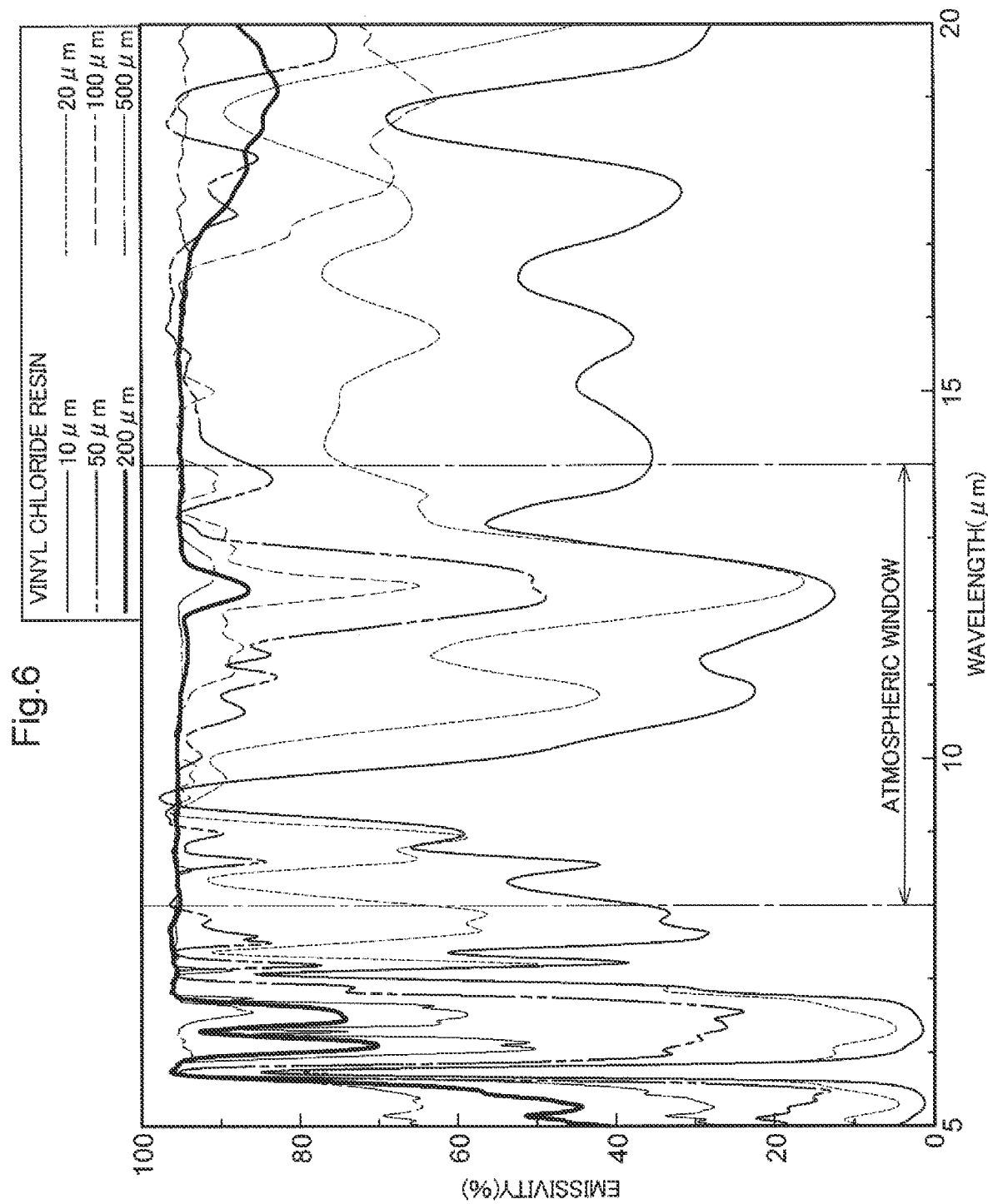
FIG. 6 is a diagram showing an emissivity spectrum of a vinyl chloride resin.
Figure 14:
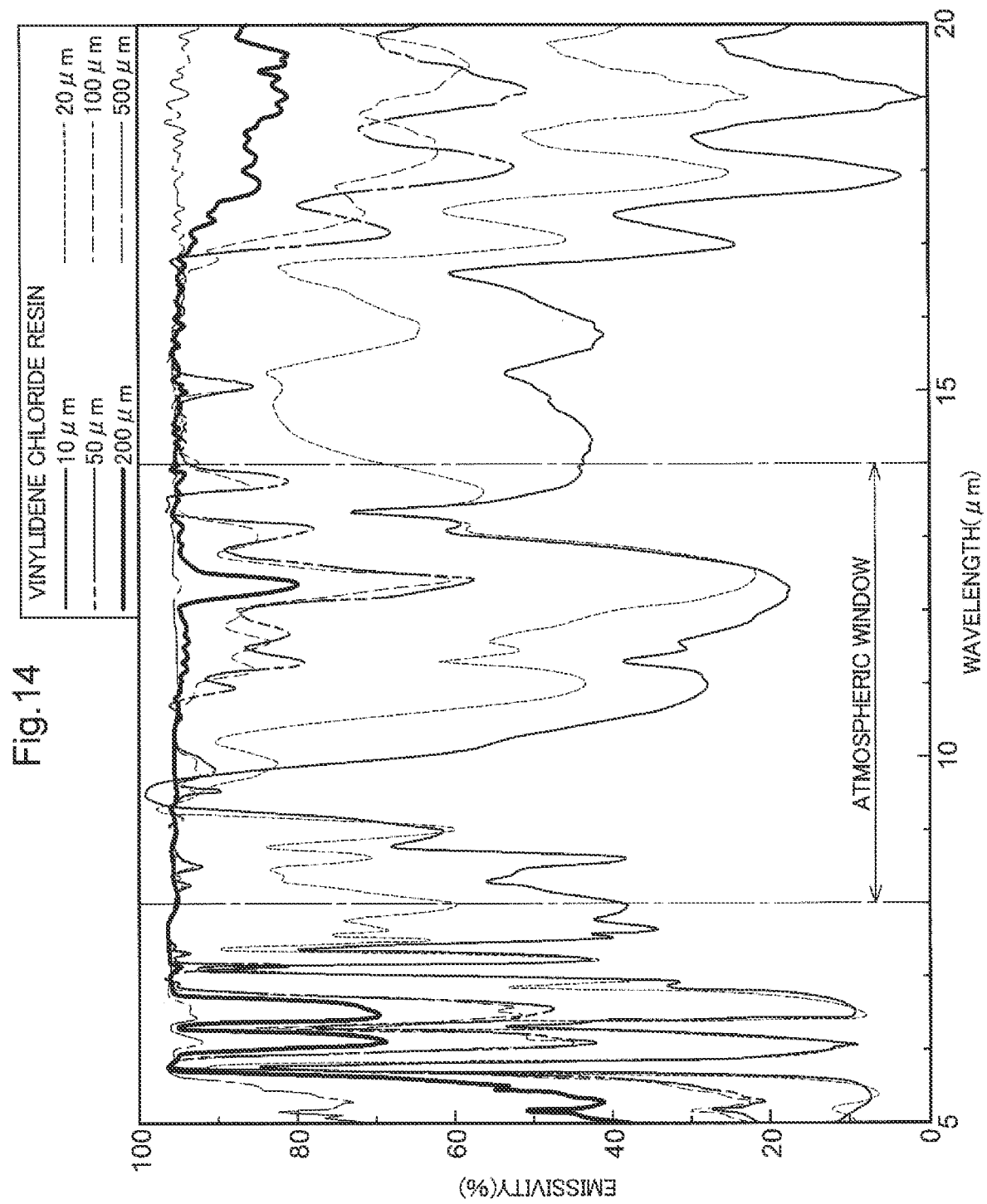
FIG. 14 is a diagram showing an emissivity spectrum of a vinylidene chloride resin.

FIG. 6 shows the emissivity of a vinyl chloride resin (PVC), which is a representative example of resins having a carbon-chlorine bond, in the atmospheric window. Also, FIG. 14 shows the emissivity of a vinylidene chloride resin (PVDC) in the atmospheric window.

As for the carbon-chlorine bond, an absorption coefficient for stretching vibration of C—Cl appears around a wavelength of 12 µm over a wide range with a half width of 1 µm or more.

Also, in the case of the vinyl chloride resin, an absorption coefficient for bending vibration of C—H in an alkene contained in the main chain appears at a wavelength of about 10 µm under the influence of electron-withdrawing of chlorine. This also applies to the vinylidene chloride resin.

Under the influence of these, a wavelength average emissivity when the thickness is 10 μm is 43% in the wavelength range from 8 μm to 14 μm and falls within the prescribed range of the wavelength average emissivity of 40% or more. As shown in FIGS. 6 and 14, the emissivity in the atmospheric window range increases as the film thickness is increased.

[Ethylene Terephthalate Resin]

Figure 7:
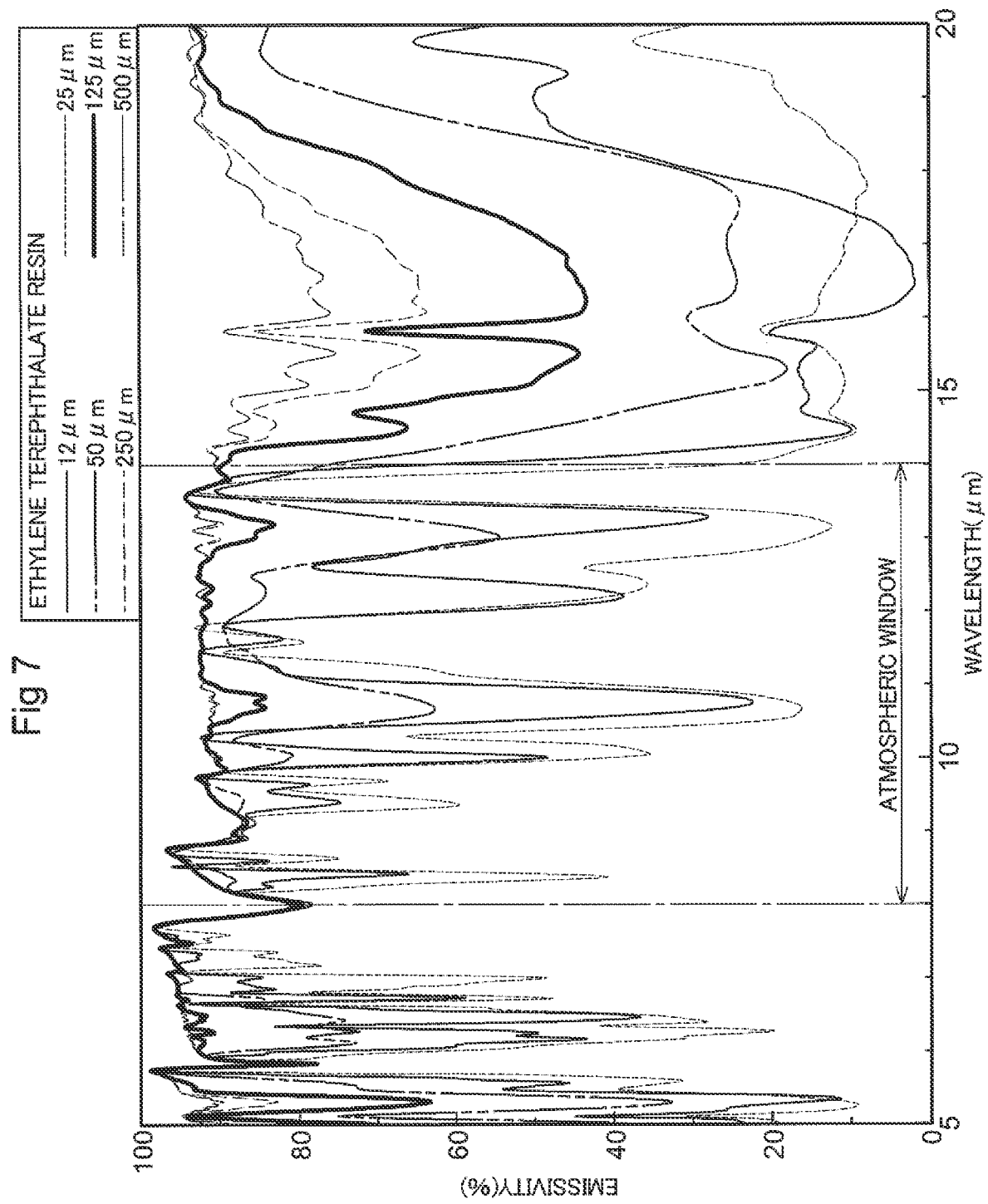
FIG. 7 is a diagram showing an emissivity spectrum of an ethylene terephthalate resin.

FIG. 7 shows the emissivity of an ethylene terephthalate resin, which is a representative example of resins having an ester bond or a benzene ring, in the atmospheric window.

An ester bond has an absorption coefficient in a wavelength range from 7.8 μm to 9.9 μm. As for a carbon-oxygen bond included in the ester bond, a large absorption coefficient appears in a wavelength range from 8 μm to 10 μm. When a benzene ring is introduced into a side chain of a hydrocarbon resin, absorption appears broadly in a wavelength range from 8.1 μm to 18 μm due to vibration of the benzene ring itself and vibration of surrounding elements under the influence of the benzene ring.

Under the influence of these, a wavelength average emissivity when the thickness is 10 μm is 71% in the wavelength range from 8 μm to 14 μm and falls within the prescribed range of the wavelength average emissivity of 40% or more. As shown in FIG. 7, the emissivity in the atmospheric window range increases as the film thickness is increased.

[Emissivity of Modified Olefin Material]

Figure 8:
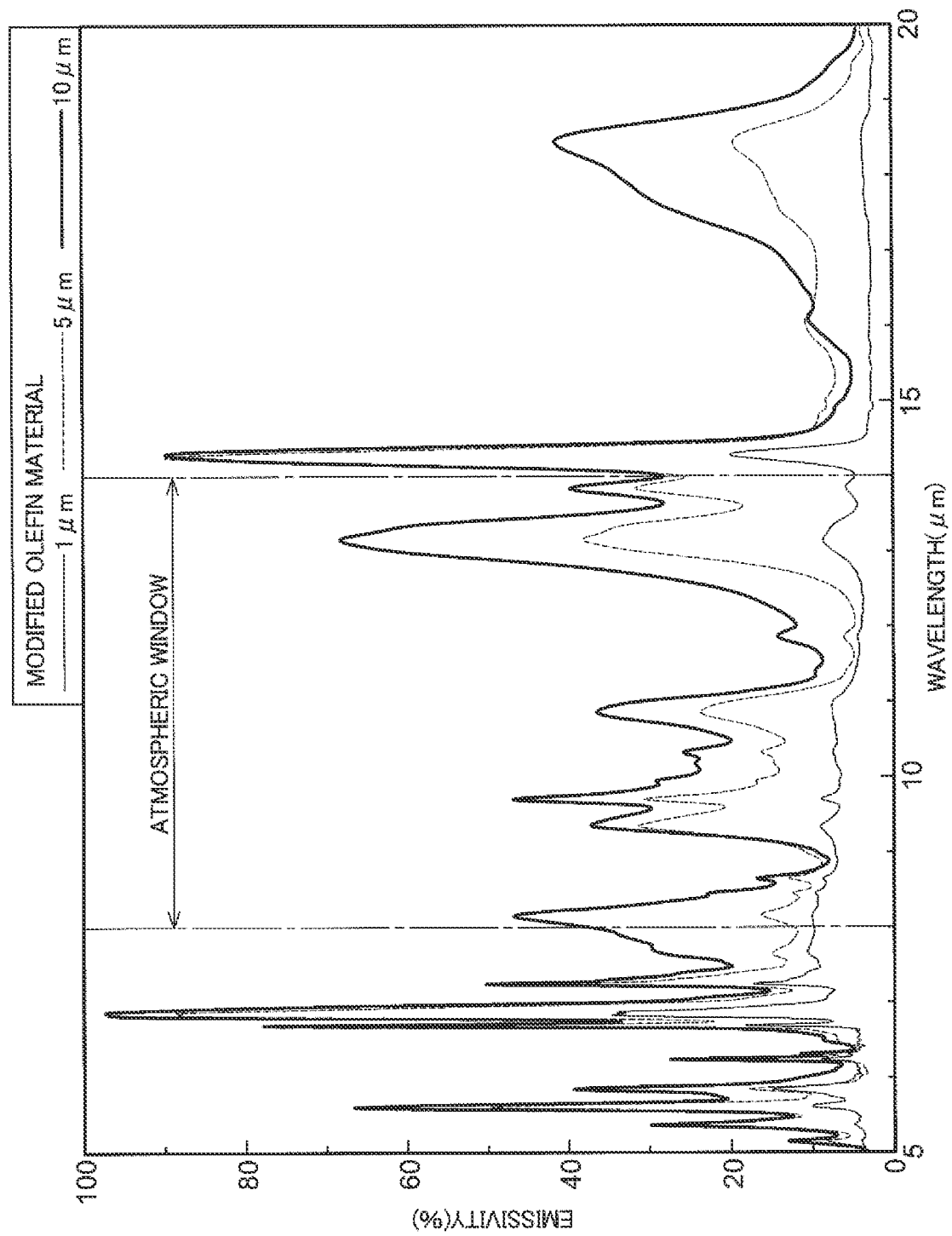
FIG. 8 is a diagram showing an emissivity spectrum of a modified olefin material.

FIG. 8 shows an emissivity spectrum of a modified olefin material that contains an olefin as a main component and does not contain a carbon-fluorine bond (C—F), a carbon-chlorine bond (C—Cl), an ester bond (R—COO—R), an ether bond (C—O—C bond), and a benzene ring. The sample was produced by applying an olefin resin to vapor-deposited silver using a bar coater and drying the olefin resin.

As shown in FIG. 8, the emissivity in the atmospheric window range is small, and under the influence of this, a wavelength average emissivity when the thickness is 10 μm is 27% in the wavelength range from 8 μm to 14 μm and does not fall within the prescribed range of the wavelength average emissivity of 40% or more.

The emissivity shown in FIG. 8 is the emissivity of the olefin resin that was modified to be applied using the bar coater, and in the case of a pure olefin resin, the emissivity in the atmospheric window range is even smaller.

As described above, radiative cooling cannot be performed if the resin material does not contain any of a carbon-fluorine bond (C—F), a carbon-chlorine bond (C—Cl), an ester bond (R—COO—R), an ether bond (C—O—C bond), and a benzene ring.

[Surface Temperatures of Light Reflective Layer and Resin Material Layer]

Heat radiation in the atmospheric window from the resin material layer J occurs in the vicinity of the surface of the resin material.

According to FIG. 4, in the case of silicone rubber, the amount of heat radiation in the atmospheric window range does not increase when the film thickness is larger than 10 μm. That is, in the case of silicone rubber, heat radiation in the atmospheric window mostly occurs in a portion of the resin material that is within a depth of about 10 μm from the surface, and radiation from a deeper portion does not go to the outside.

According to FIG. 5, in the case of a fluorocarbon resin, the amount of heat radiation in the atmospheric window range hardly increases even when the film thickness is increased to more than 100 μm. That is, in the case of a fluorocarbon resin, heat radiation in the atmospheric window occurs in a portion of the resin material that is within a depth of about 100 μm from the surface, and radiation from a deeper portion does not go to the outside.

According to FIG. 6, in the case of a vinyl chloride resin, the amount of heat radiation in the atmospheric window range hardly increases even when the film thickness is increased to more than 100 μm. That is, in the case of a vinyl chloride resin, heat radiation in the atmospheric window occurs in a portion of the resin material that is within a depth of about 100 μm from the surface, and radiation from a deeper portion does not go to the outside.

FIG. 14 shows that the matter described for the vinyl chloride resin also applies to a vinylidene chloride resin.

According to FIG. 7, in the case of an ethylene terephthalate resin, the amount of heat radiation in the atmospheric window range hardly increases even when the film thickness is increased to more than 125 μm. That is, in the case of an ethylene terephthalate resin, heat radiation in the atmospheric window occurs in a portion of the resin material that is within a depth of about 100 μm from the surface, and radiation from a deeper portion does not go to the outside.

As described above, heat radiation from the surface of the resin material in the atmospheric window range occurs in a portion of the resin material that is within a depth of about 100 μm from the surface, and when the thickness of the resin material is increased to more than 100 μm, cold heat obtained through radiative cooling performed by the radiative cooling device CP is insulated by a portion of the resin material that does not contribute to heat radiation.

Assume a case where an ideal resin material layer J that does not absorb sunlight at all is formed on the light reflective layer B. In this case, sunlight is only absorbed by the light reflective layer B of the radiative cooling device CP.

Resin materials generally have a thermal conductivity of about 0.2 W/m/K, and when a calculation is performed taking the thermal conductivity into account, the temperature of a cooling surface (a surface of the light reflective layer B on the side opposite to the resin material layer J) increases when the thickness of the resin material layer J is larger than 20 mm.

Figure 9:
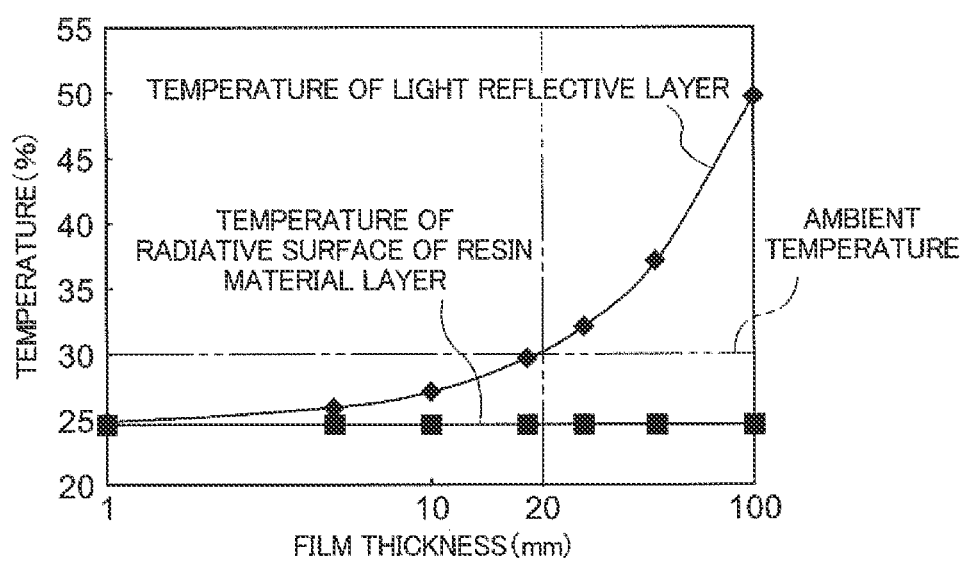
FIG. 9 is a diagram showing a relationship between a temperature of a radiative surface and a temperature of a light reflective layer.

Even if there is an ideal resin material that does not absorb sunlight at all, the thermal conductivity of a resin material is generally about 0.2 W/m/K, and accordingly, as shown in FIG. 9, when the thickness of the resin material layer is larger than 20 mm, the light reflective layer B is heated by solar radiation and the cooling target E disposed on the light reflective layer side is heated. That is, the thickness of the resin material in the radiative cooling device CP needs to be 20 mm or less.

Note that FIG. 9 shows a plot of a surface temperature of the radiative surface H and the temperature of the light reflective layer B in the radiative cooling device CP (radiative cooling film), which were calculated assuming the time of meridian transit on a sunny day in midsummer in western Japan. The calculation was performed assuming AM1.5 sunlight with an energy density of 1000 W/m². The ambient temperature is 30° C., and radiation energy is 100 W at 30° C., although this varies according to the temperature. The calculation was performed assuming that the resin material layer J did not absorb sunlight. The calculation was performed assuming that the radiative cooling device was used in a windless state and the convective heat transfer coefficient was 5 W/m²/K.

[Absorptivity of Silicone Rubber and the Like]

FIG. 10 shows an absorptivity spectrum of silicone rubber that contains $CH_3$ as a side chain and has a thickness of 100

µm relative to the sunlight spectrum and an absorptivity spectrum of a perfluoroalkoxy fluorocarbon resin with a thickness of 100 µm relative to the sunlight spectrum. It can be found that both of these resins have almost no absorptivity in the ultraviolet range as described above.

As for silicone rubber, the absorptivity increases in the near-infrared range at wavelengths longer than 2.35 µm. However, the intensity of the sunlight spectrum in this wavelength range is low, and therefore, even if the absorptivity at wavelengths longer than 2.35 µm is 100%, the absorbed solar energy is 20 W/m$^2$.

The perfluoroalkoxy fluorocarbon resin has almost no absorptivity in a wavelength range from 0.3 µm to 2.5 µm and absorbs light having wavelengths longer than 2.5 µm. However, even if the film thickness of this resin is increased and the absorptivity at wavelengths longer than 2.5 µm becomes 100%, the absorbed solar energy is about 7 W.

Note that the emissivity in the atmospheric window range becomes approximately 1 when the thickness (film thickness) of the resin material layer J is increased. That is, when the thickness of the resin material layer is large, the amount of heat radiated to the universe in the atmospheric window range when the radiative cooling device is used in a lowland is about 160 W/m$^2$ to 125 W/m$^2$ at 30° C. The amount of light absorbed by the light reflective layer B is about 50 W/m$^2$ as described above, and a sum of the amount of light absorbed by the light reflective layer B and the amount of sunlight absorbed by a thick film of silicone rubber or the perfluoroalkoxy fluorocarbon resin is smaller than the amount of heat radiated to the universe.

Therefore, the maximum film thickness of silicone rubber and the perfluoroalkoxy fluorocarbon resin is 20 mm from the viewpoint of thermal conductivity.

[Light Absorption by Hydrocarbon Resin]

In a case where the resin material forming the resin material layer J is a resin that contains, as a main chain, a hydrocarbon having one or two or more of a carbon-chlorine bond, a carbon-oxygen bond, an ester bond, an ether bond, and a benzene ring or the resin material is a silicone resin that contains a hydrocarbon having 2 or more carbon atoms as a side chain, absorption through vibration, such as bending or stretching of bonds, is observed in the near-infrared range, in addition to ultraviolet ray absorption by electrons contributing to covalent bonds described above.

Specifically, absorption based on fundamental tones of transitions of $CH_3$, $CH_2$, and CH to the first excited state appears in a wavelength range from 1.6 µm to 1.7 µm, a wavelength range from 1.65 µm to 1.75 µm, and at a wavelength of 1.7 µm, respectively. Furthermore, absorption based on fundamental tones of combination tones of $CH_3$, $CH_2$, and CH appears at a wavelength of 1.35 µm, a wavelength of 1.38 µm, and a wavelength of 1.43 µm, respectively. Furthermore, overtones of transitions of $CH_2$ and CH to the second excited state appear around a wavelength of 1.24 µm. Fundamental tones of bending and stretching of a C—H bond are widely distributed in a wavelength range from 2 µm to 2.5 µm.

Also, in a case where the resin material has an ester bond (R—COO—R) or an ether bond (C—O—C), large light absorption appears around a wavelength of 1.9 µm.

According to the absorptivity relational expression described above, absorptivities for these vibrations and bonds are small and inconspicuous when the film thickness of the resin material is small, but become large when the film thickness is large.

Figure 11:
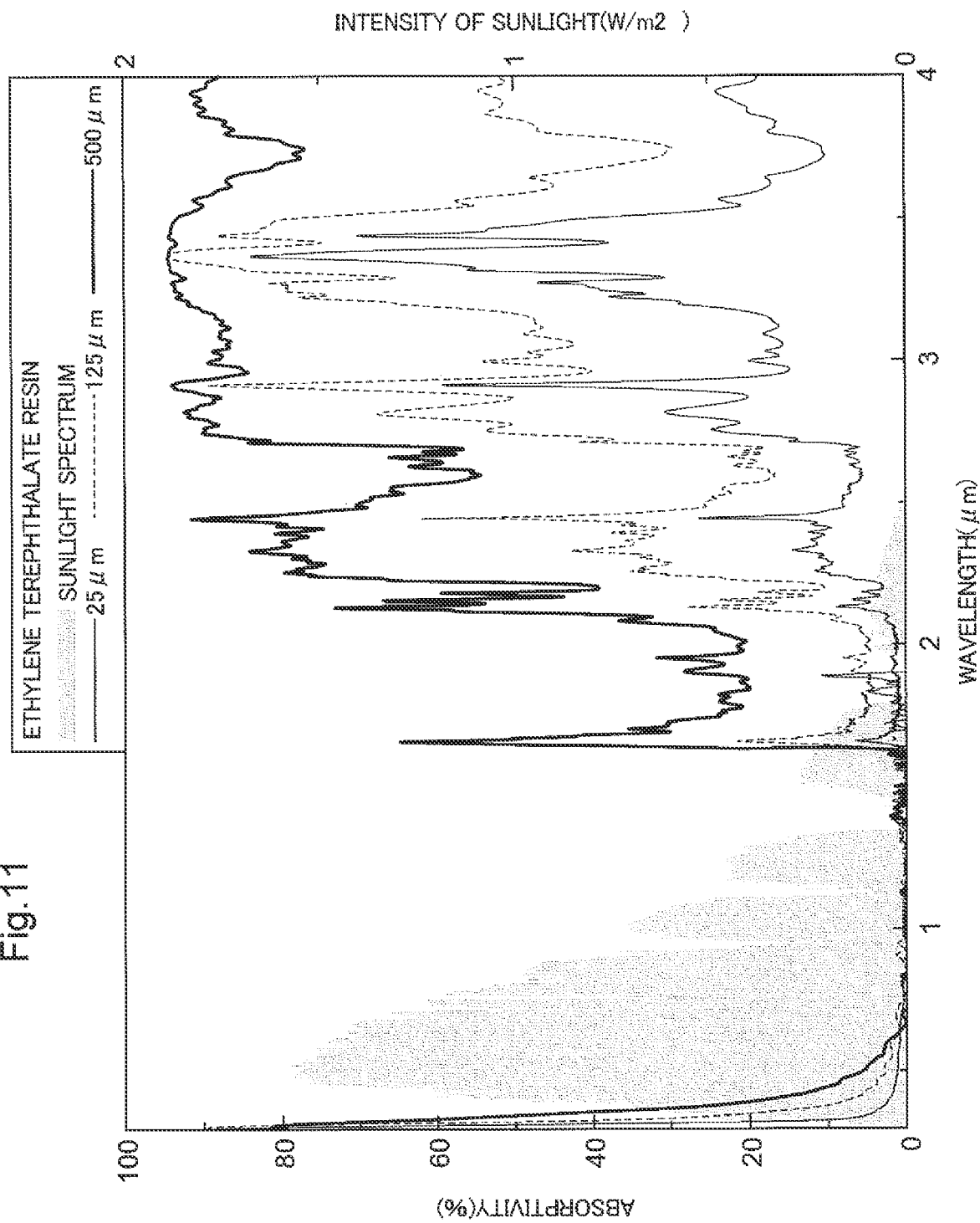
FIG. 11 is a diagram showing an absorptivity spectrum of an ethylene terephthalate resin.

FIG. 11 shows a relationship between the absorptivity of an ethylene terephthalate resin having an ester bond and a benzene ring and the sunlight spectrum in a case where the film thickness is changed.

As shown in FIG. 11, at wavelengths longer than 1.5 µm, light absorption through each vibration increases as the film thickness is increased from 25 µm to 125 µm and 500 µm.

Light absorption increases not only on the long wavelength side but also in the ultraviolet range and the visible range. This is because a light absorption edge for a chemical bond has some width.

When the film thickness is small, the absorptivity becomes large at a wavelength at which the resin has the maximum absorption coefficient, but when the film thickness is increased, a small absorption coefficient for an absorption edge having a width appears as an absorptivity according to the absorptivity relational expression described above. Therefore, when the film thickness is increased, light absorption in the ultraviolet range and the visible range increases.

When the thickness is 25 µm, absorption of the sunlight spectrum is 15 W/m$^2$. When the thickness is 125 µm, absorption of the sunlight spectrum is 41 W/m$^2$. When the thickness is 500 µm, absorption of the sunlight spectrum is 88 W/m$^2$.

The amount of light absorbed by the light reflective layer B is 50 W/m$^2$ according to the prescriptions described above, and therefore, when the film thickness is 500 µm, the sum of sunlight absorbed by the ethylene terephthalate resin and sunlight absorbed by the light reflective layer B is 138 W/m$^2$. As described above, the maximum value of infrared radiation in the wavelength band of the atmospheric window in summer at a lowland in Japan is about 160 W at 30° C. when the atmosphere is in good conditions, and is usually about 125 W.

Therefore, the radiative cooling properties are not exhibited when the film thickness of the ethylene terephthalate resin is 500 µm or more.

The origin of the absorption spectrum in the wavelength range from 1.5 µm to 4 µm is vibration of a hydrocarbon in the main chain, rather than a functional group, and a hydrocarbon resin shows behavior similar to that of the ethylene terephthalate resin. Also, a hydrocarbon resin shows light absorption by chemical bonds in the ultraviolet range, and shows behavior similar to that of the ethylene terephthalate resin in the ultraviolet range and the visible range as well.

That is, a hydrocarbon resin shows behavior similar to that of the ethylene terephthalate resin in a wavelength range from 0.3 µm to 4 µm. Therefore, the film thickness of a hydrocarbon resin needs to be smaller than 500 µm.

[Light Absorption by Blend Resin]

In a case where the resin material is obtained by blending a resin that contains a carbon-fluorine bond or a siloxane bond as a main chain and a resin that contains a hydrocarbon as a main chain, light absorption by CH, $CH_2$, $CH_3$, or the like appears in the near-infrared range according to the proportion of the blended resin containing a hydrocarbon as a main chain.

When the carbon-fluorine bond or the siloxane bond is the main component, light absorption by the hydrocarbon in the near-infrared range is small, and therefore, the film thickness can be increased up to 20 mm, which is the upper limit set from the viewpoint of thermal conductivity. However, when the blended hydrocarbon resin is the main component, the film thickness needs to be set to 500 µm or less.

Note that a blend of a hydrocarbon and a fluorocarbon resin or silicone rubber encompasses a product obtained by substituting a side chain of the fluorocarbon resin or silicone rubber with the hydrocarbon, and an alternating copolymer, a random copolymer, a block copolymer, and a graft copolymer of a hydrocarbon monomer and a fluorine monomer or a silicone monomer. Examples of alternating copolymers of a fluorine monomer and a hydrocarbon monomer include fluoroethylene-vinyl ester (FEVE), a fluoroolefin-acrylic ester copolymer, an ethylene-tetrafluoroethylene copolymer (ETFE), and an ethylene-chlorotrifluoroethylene copolymer (ECTFE).

Light absorption by $CH$, $CH_2$, $CH_3$, or the like in the near-infrared range appears according to the molecular weight and proportion of the hydrocarbon side chain, which serves as a substituent. When the monomer introduced as a side chain or a copolymerization monomer has a low molecular weight or the density of the introduced monomer is low, light absorption by the hydrocarbon in the near-infrared range is small, and therefore, the film thickness can be increased to the upper limit of 20 mm set from the viewpoint of thermal conductivity.

When a high-molecular weight hydrocarbon is introduced as a side chain or a copolymerization monomer into a fluorocarbon resin or silicone rubber, the thickness of the resin needs to be set to 500 μm or less.

[Thickness of Resin Material Layer]

From the viewpoint of practical use of the radiative cooling device CP, the thinner the resin material layer J, the better. The thermal conductivity of a resin material is generally lower than those of metal, glass, and the like. In order to effectively cool the cooling target E, it is preferable that the resin material layer J has the minimum required thickness. Heat radiation in the atmospheric window increases as the film thickness of the resin material layer J is increased, and heat radiation energy in the atmospheric window is saturated when the film thickness exceeds a certain thickness.

Although the film thickness at which heat radiation energy is saturated varies according to the resin material, in the case of a fluorocarbon resin, heat radiation energy is generally sufficiently saturated when the film thickness is 300 μm. Therefore, from the viewpoint of thermal conductivity, it is desirable to set the film thickness to be no greater than 300 μm, rather than 500 μm. Furthermore, even when the thickness is about 100 μm, sufficient heat radiation can be obtained in the atmospheric window range although heat radiation is not saturated. The smaller the thickness is, the higher the thermal transmittance becomes and the more effectively the temperature of the cooling target can be reduced, and therefore, in the case of a fluorocarbon resin, the thickness is preferably set to about 100 μm or less.

Absorption coefficients of a carbon-silicon bond, a carbon-chlorine bond, a carbon-oxygen bond, an ester bond, and an ether bond are larger than an absorption coefficient of a C—F bond. Naturally, it is desirable to set the film thickness to be no greater than 300 μm, rather than 500 μm, from the viewpoint of thermal conductivity, but if the film thickness is further reduced to increase the thermal conductivity, an even greater radiative cooling effect can be expected.

In the case of a resin that contains any of a carbon-chlorine bond, a carbon-oxygen bond, an ester bond, an ether bond, and a benzene ring, heat radiation energy is saturated even when the thickness is 100 μm, and sufficient heat radiation can be obtained in the atmospheric window range even when the thickness is 50 μm. The smaller the thickness of the resin material is, the higher the thermal transmittance becomes and the more effectively the temperature of the cooling target can be reduced, and therefore, in the case of a resin containing any of a carbon-chlorine bond, a carbon-oxygen bond, an ester bond, an ether bond, and a benzene ring, it is possible to suppress thermal insulation properties and effectively cool the cooling target E by setting the thickness to 50 μm or less. In the case of a resin containing a carbon-chlorine bond, it is possible to effectively cool the cooling target E when the thickness is 100 μm or less.

When the thickness is reduced, it is possible to obtain an effect other than the effect of suppressing thermal insulation properties and facilitating conduction of cold heat. That is, it is possible to suppress light absorption by $CH$, $CM$, and $CH_3$ in the near-infrared range, which occurs in the case of a resin that contains any of a carbon-chlorine bond, a carbon-oxygen bond, an ester bond, and an ether bond. When the thickness is reduced, absorption of sunlight by these can be suppressed and consequently, cooling capability of the radiative cooling device CP is increased.

From the viewpoint described above, in the case of a resin containing any of a carbon-chlorine bond, a carbon-oxygen bond, an ester bond, an ether bond, and a benzene ring, the radiative cooling effect can be more effectively exhibited under solar radiation when the thickness is 50 μm or less.

In the case of a carbon-silicon bond, heat radiation in the atmospheric window is sufficiently saturated even when the thickness is 50 μm, and sufficient heat radiation can be obtained in the atmospheric window even when the thickness is 10 μm. The smaller the thickness of the resin material layer J is, the higher the thermal transmittance becomes and the more effectively the temperature of the cooling target E can be reduced, and therefore, in the case of a resin containing a carbon-silicon bond, it is possible to suppress thermal insulation properties and effectively cool the cooling target E by setting the thickness to 10 μm or less. When the thickness is reduced, absorption of sunlight can be suppressed and consequently, cooling capability of the radiative cooling device CP is increased.

From the viewpoint described above, in the case of a resin containing a carbon-silicon bond, the radiative cooling effect can be more effectively exhibited under solar radiation when the thickness is 10 μm or less.

[Details of Light Reflective Layer]

In order to make the light reflective layer B have the reflectance characteristics described above, silver or a silver alloy needs to be used as a reflective material disposed on the radiative surface H side (the resin material layer J side).

Figure 12:
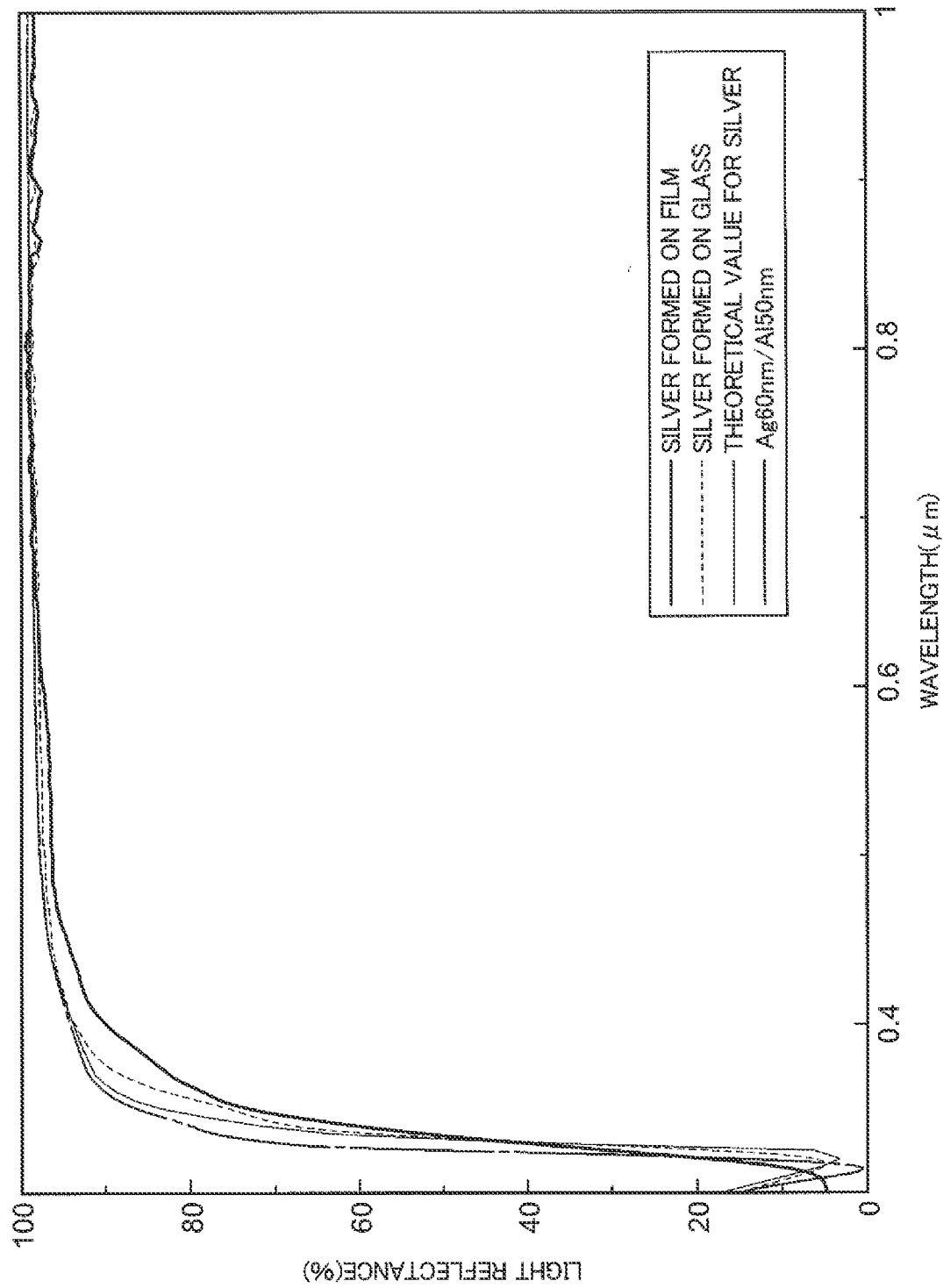
FIG. 12 is a diagram showing a reflectance spectrum of a light reflective layer that contains silver as a base material.

As shown in FIG. 12, when silver is used as a base material of the light reflective layer B, the light reflective layer B can have the required reflectance.

In a case where sunlight is to be reflected only by silver or a silver alloy so as to satisfy the reflectance characteristics described above, a thickness of 50 nm or more is required.

However, in order to make the light reflective layer B flexible, the thickness needs to be 100 μm or less. If the thickness is larger than 100 μm, the light reflective layer becomes difficult to bend.

It is possible to use, as a silver alloy, an alloy obtained by adding any of copper, palladium, gold, zinc, tin, magnesium, nickel, and titanium in an amount of, for example, about 0.4 mass % to 4.5 mass % to silver. As a specific example, it is possible to use "APC-TR (manufactured by Furuya Metal Co., Ltd.)", which is a silver alloy manufactured by adding copper and palladium to silver.

In order to make the light reflective layer B have the reflectance characteristics described above, it is also possible to adopt a structure obtained by stacking silver or a silver alloy disposed adjacent to the protective layer D and aluminum or an aluminum alloy disposed apart from the protective layer D. In this case as well, it is necessary to use silver or a silver alloy as the reflective material disposed on the radiative surface H side (the resin material layer J side).

In the case where the light reflective layer is constituted by two layers made of silver (silver alloy) and aluminum (aluminum alloy), the thickness of the silver layer needs to be 10 nm or more and the thickness of the aluminum layer needs to be 30 nm or more.

However, in order to make the light reflective layer B flexible, the sum of the thickness of the silver layer and the thickness of the aluminum layer needs to be 100 μm or less. If the sum is larger than 100 μm, the light reflective layer becomes difficult to bend.

It is possible to use, as an aluminum alloy, an alloy obtained by adding any of copper, manganese, silicon, magnesium, zinc, carbon steel for mechanical structures, yttrium, lanthanum, gadolinium, and terbium to aluminum.

Silver and a silver alloy are weak to rain and moisture and need to be protected from them. Also, discoloration of silver and a silver alloy needs to be suppressed. Therefore, the protective layer D that protects silver needs to be provided adjacent to silver or a silver alloy as shown in FIGS. 16 to 19.

Details of the protective layer D will be described later.

[Experimental Results]

Silver layers with a thickness of 300 nm were formed on glass substrates, and silicone rubber having a siloxane bond, fluoroethylene vinyl ether having a carbon-fluorine bond, a modified olefin (modified olefin material), and a vinyl chloride resin were applied to the silver layers using a bar coater while controlling the film thickness, and radiative cooling performance was measured.

The radiative cooling performance was evaluated outdoors at an ambient temperature of 35° C. when 3 hours elapsed from the time of meridian transit in late June by measuring the temperature (° C.) of rear surfaces of the substrates while keeping the substrates in a highly thermally insulated state. As for the vinyl chloride resin, the evaluation was performed at an ambient temperature of 29° C. Whether or not the radiative cooling effect was exhibited was evaluated based on whether the temperature was lower or higher than the ambient temperature when 5 minutes elapsed after the substrates were set on a jig.

FIG. 15 shows results of the radiative cooling test.

Figure 13:
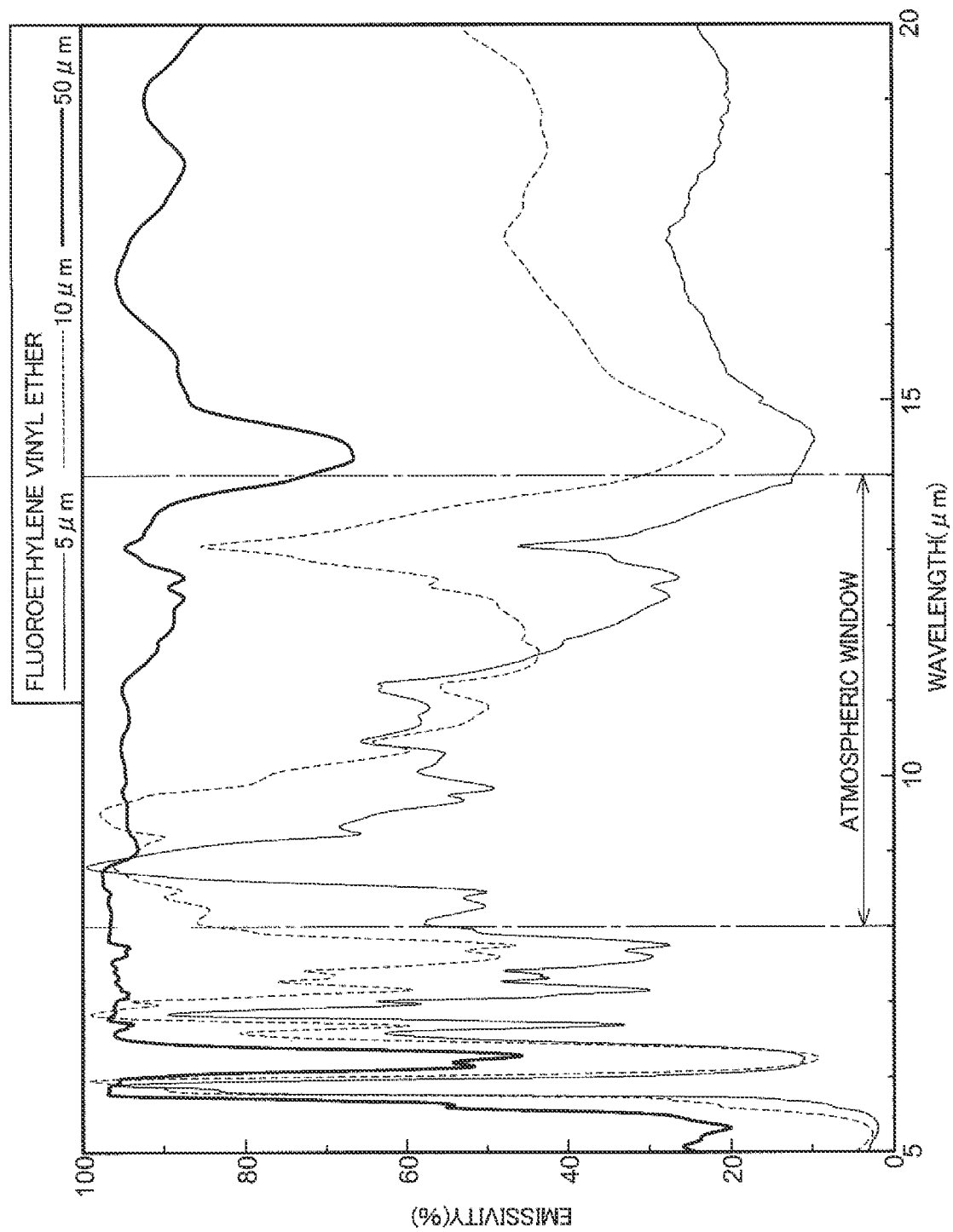
FIG. 13 is a diagram showing an emissivity spectrum of fluoroethylene vinyl ether.

Note that the emissivity of fluoroethylene vinyl ether in the atmospheric window range is as shown in FIG. 13. The emissivity of silicone rubber is as shown in FIG. 4, the emissivity of the modified olefin (modified olefin material) is as shown in FIG. 8, and the emissivity of the vinyl chloride resin is as shown in FIG. 6.

It was found that silicone rubber having a siloxane bond exhibited radiative cooling capability with a thickness of 1 μm or more as theoretically expected.

It was found that fluoroethylene vinyl ether having a carbon-fluorine bond exhibited radiative cooling capability with a thickness of 5 μm, which is thinner than the theoretically expected film thickness of 10 μm. This is because not only light absorption by the carbon-fluorine bond in the atmospheric window, light absorption by an ether bond in vinyl ether was added, and the absorptivity in the atmospheric window increased when compared with cases where either the carbon-fluorine bond or the ether bond was contained alone.

The modified olefin (modified olefin material) hardly radiates heat in the atmospheric window range, and accordingly does not have radiative cooling capability.

[Specific Configuration of Radiative Cooling Device]

As shown in FIGS. 16 to 19, the radiative cooling device CP according to the present invention can be made so as to have a film structure. Resin materials forming the resin material layer J and the protective layer D are flexible, and accordingly, when the light reflective layer B is formed as a thin film, the light reflective layer B can be made flexible as well, and consequently the radiative cooling device CP can be made as a flexible film (radiative cooling film).

The film-shaped radiative cooling device CP (radiative cooling film) can be wrapped around an outer circumferential surface of an automobile, an external wall of a warehouse or a building, or an outer circumferential surface of a helmet using an adhesive, for example. Thus, it is possible to easily make the radiative cooling device CP exhibit its radiative cooling capability through post attachment of the radiative cooling device CP to an existing object.

The film-shaped radiative cooling device CP (radiative cooling film) can be attached to various objects that need to be cooled, such as outer surfaces of various tents, an outer surface of a box for housing electrical equipment or the like, an outer surface of a container used for goods transportation, an outer surface of a milk tank for storing milk, and an outer surface of a milk storage portion of a milk tank lorry.

Various forms are conceivable to make the radiative cooling device CP in a film shape. For example, it is conceivable to apply the protective layer D and the resin material layer J to the light reflective layer B formed in a film shape. Alternatively, it is conceivable to attach the protective layer D and the resin material layer J to the light reflective layer B formed in a film shape. Alternatively, it is conceivable to apply or attach the protective layer D to the resin material layer J formed in a film shape, and form the light reflective layer B on the protective layer D through vapor deposition, sputtering, ion plating, a silver mirror reaction, or the like.

More specifically, a radiative cooling device CP (radiative cooling film) shown in FIG. 16 is obtained by forming the protective layer D on the upper side of the light reflective layer B, forming the resin material layer J on the protective layer D, and also forming a lower protective layer Ds on the lower side of the light reflective layer B in a case where the light reflective layer B is constituted by a single layer of silver or a silver alloy or two layers respectively made of silver (silver alloy) and aluminum (aluminum alloy). The color layer P is formed on the upper side of the resin material layer J.

As a method for producing the radiative cooling device CP (radiative cooling film) shown in FIG. 16, it is possible to use a method of applying the protective layer D, the light reflective layer B, and the lower protective layer Ds in this order on the resin material layer J formed in a film shape to form these layers into a single piece.

A radiative cooling device CP (radiative cooling film) shown in FIG. 17 is obtained by forming the light reflective layer B that is constituted by an aluminum layer B1 formed from aluminum foil serving as aluminum (aluminum alloy) and a silver layer B2 made of silver or a silver alloy, forming the protective layer D on the upper side of the light reflective layer B, and forming the resin material layer J on the protective layer D. The color layer P is formed on the upper side of the resin material layer J.

As a method for producing the radiative cooling device CP (radiative cooling film) shown in FIG. 17, it is possible to use a method of applying the silver layer B2, the protective layer D, and the resin material layer J in this order on the aluminum layer B1 formed from aluminum foil, to form these layers into a single piece.

As another method, it is possible to use a method of forming the resin material layer J in a film shape, applying the protective layer D and the silver layer B2 in this order on the film-shaped resin material layer J, and attaching the aluminum layer B1 to the silver layer B2.

Figure 18:
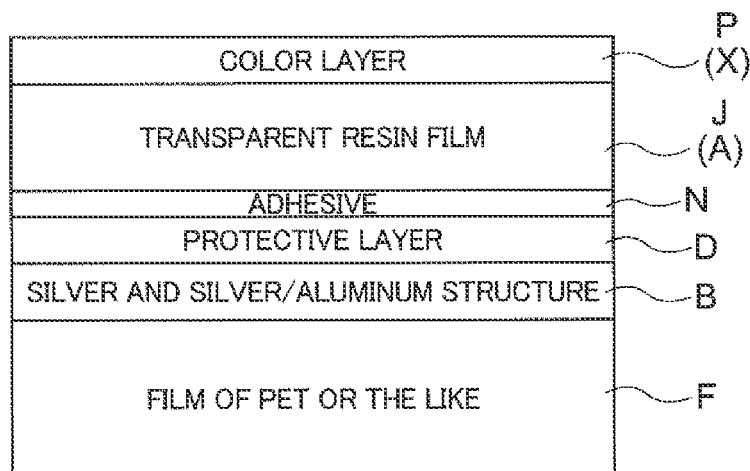
FIG. 18 is a diagram showing a specific configuration of the radiative cooling device.

A radiative cooling device CP (radiative cooling film) shown in FIG. 18 is obtained by forming the protective layer D on the upper side of the light reflective layer B, forming the resin material layer J on the protective layer D, and forming a film layer F made of PET or the like on the lower side of the light reflective layer B in a case where the light reflective layer B is constituted by a single layer made of silver or a silver alloy or two layers respectively made of silver (silver alloy) and aluminum (aluminum alloy). The color layer P is formed on the upper side of the resin material layer J.

As a method for producing the radiative cooling device CP (radiative cooling film) shown in FIG. 18, it is possible to use a method of applying the light reflective layer B and the protective layer D in this order on the film layer F (corresponding to a substrate) formed in a film shape using PET (ethylene terephthalate resin) or the like to form these layers into a single piece, and joining (attaching) the resin material layer J, which has been separately formed, to the protective layer D using an adhesive layer N (an example of a joining layer).

Examples of adhesive agents (pressure-sensitive adhesive agents) that can be used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and it is desirable to use an adhesive agent (pressure-sensitive adhesive agent) that is highly transparent with respect to sunlight.

Figure 19:
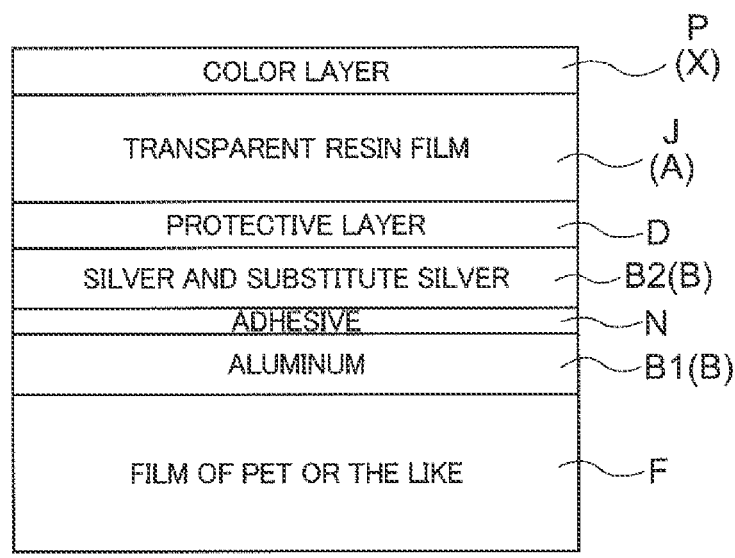
FIG. 19 is a diagram showing a specific configuration of the radiative cooling device.

A radiative cooling device CP (radiative cooling film) shown in FIG. 19 includes the light reflective layer B which is formed of an aluminum layer B1 which serves as aluminum (aluminum alloy) and a silver layer B2 which is made of silver or a silver alloy (substitute silver). The radiative cooling device CP (radiative cooling film) is obtained by forming the aluminum layer B1, on a film layer F (corresponding to a substrate) formed in a film shape using PET (ethylene terephthalate resin) or the like, forming the protective layer D on the upper side of the silver layer B2, and forming the resin material layer J on the upper side of the protective layer D. The color layer P is formed on the upper side of the resin material layer J.

As a method for producing the radiative cooling device CP (radiative cooling film) shown in FIG. 19, it is possible to use a method of applying the aluminum layer B1 to the film layer F to form the film layer F and the aluminum layer B1 into a single piece, applying the protective layer D and the silver layer B2 to the film-shaped resin material layer J to form the resin material layer J, the protective layer D, and the silver layer B2 into a single piece, and joining the aluminum layer B1 and the silver layer B2 using an adhesive layer N.

Examples of adhesive agents (pressure-sensitive adhesive agents) that can be used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and it is desirable to use an adhesive agent (pressure-sensitive adhesive agent) that is highly transparent with respect to sunlight.

[Details of Protective Layer]

The protective layer D is formed from a polyolefin based resin with a thickness of 300 nm or more and 40 µm or less or polyethylene terephthalate with a thickness of 17 µm or more and 40 µm or less.

Examples of the polyolefin based resin include polyethylene and polypropylene.

Figure 20:
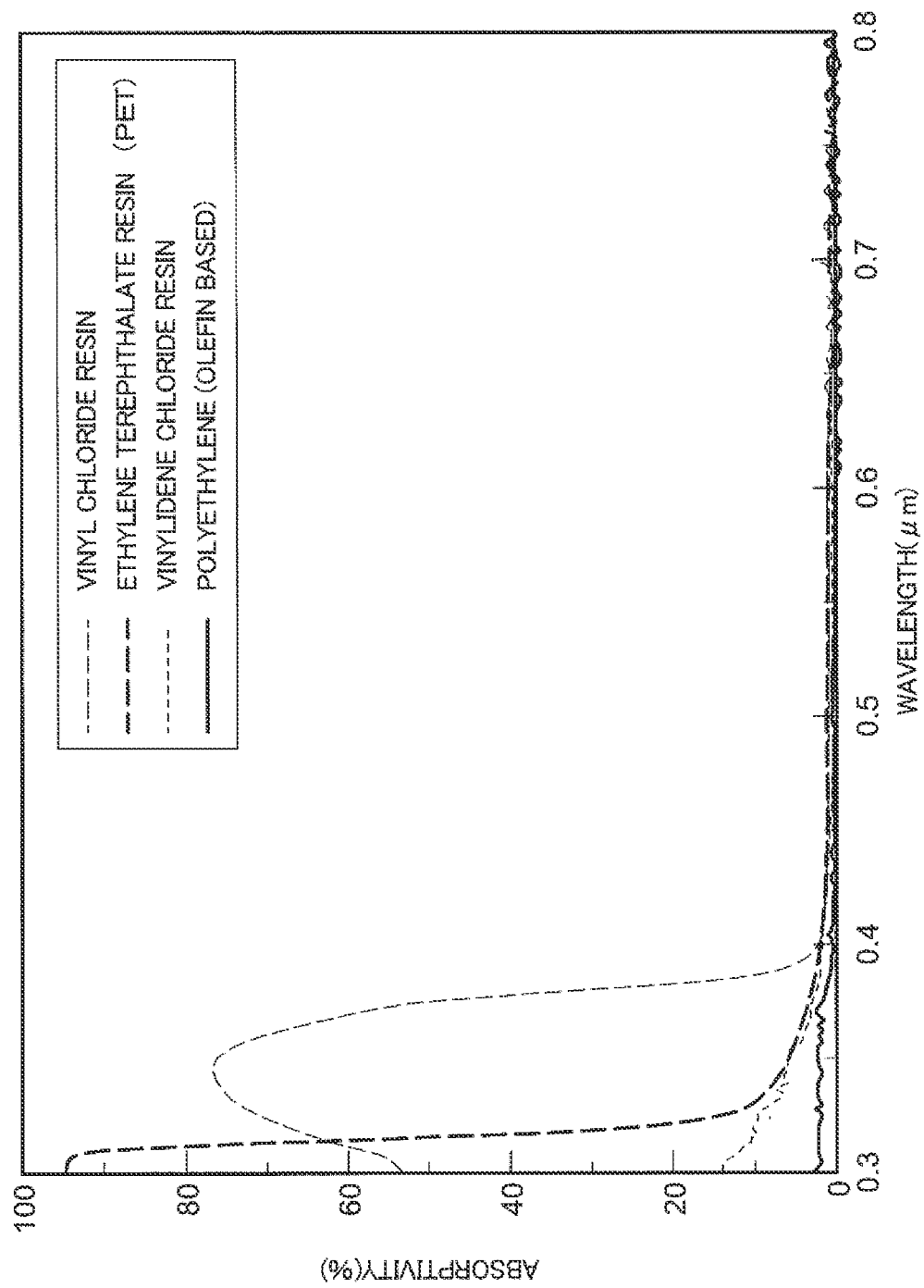
FIG. 20 is a diagram showing a relationship between absorptivities of resin materials and the wavelength.

FIG. 20 shows absorptivities of polyethylene, a vinylidene chloride resin, an ethylene terephthalate resin, and a vinyl chloride resin for ultraviolet rays.

Figure 21:
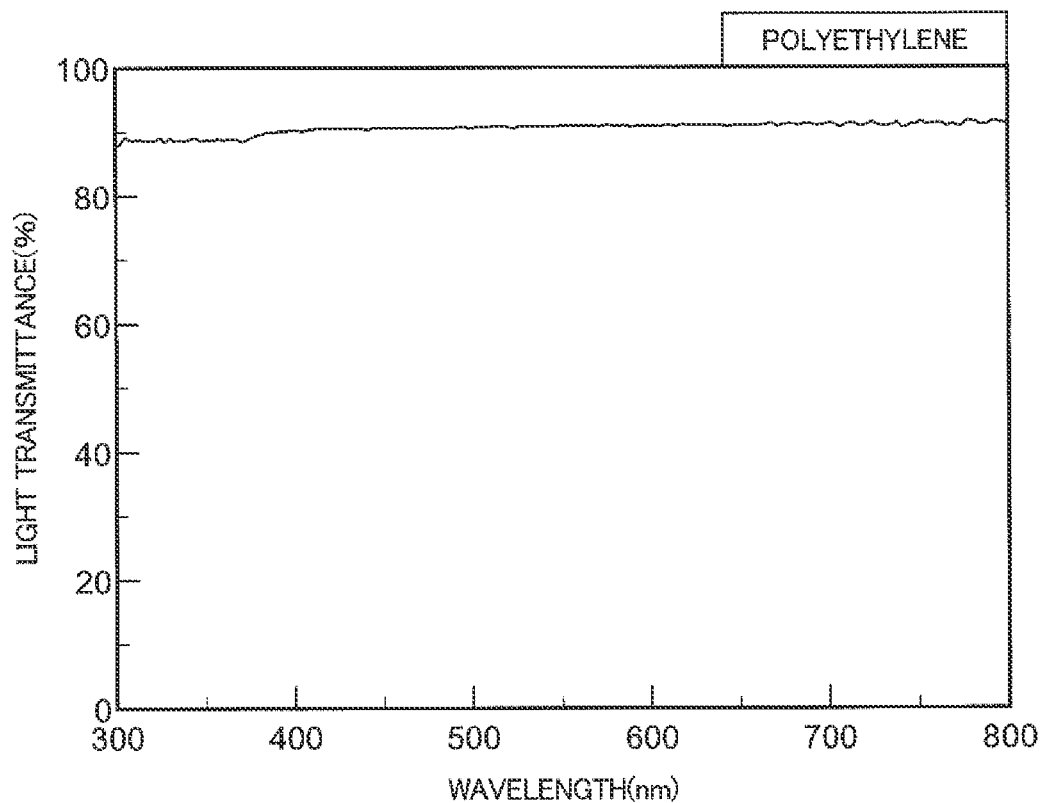
FIG. 21 is a diagram showing a relationship between the light transmittance of polyethylene and the wavelength.

FIG. 21 shows a light transmittance of polyethylene, which is preferably used as a synthetic resin for forming the protective layer D.

The radiative cooling device CP (radiative cooling film) exhibits radiative cooling action not only at night but also under solar radiation. Accordingly, in order to maintain a state in which the light reflective layer B exhibits its light reflecting function, it is necessary to prevent discoloration of silver constituting the light reflective layer B under solar radiation by protecting the light reflective layer B using the protective layer D.

In the case where the protective layer D is formed from a polyolefin based resin with a thickness of 300 nm or more and 40 µm or less, the protective layer D is unlikely to be deteriorated by absorbing ultraviolet rays because the polyolefin based resin is a synthetic resin that has an absorptivity of 10% or less for ultraviolet rays over the entire wavelength range of ultraviolet rays from 0.3 µm to 0.4 µm.

Moreover, since the thickness of the polyolefin based resin forming the protective layer D is 300 nm or more, the protective layer D favorably exhibits a blocking function of blocking radicals generated in the resin material layer J so as not to reach silver or a silver alloy forming the light reflective layer B and blocking moisture that has permeated through the resin material layer J so as not to reach silver or a silver alloy forming the light reflective layer B, and thus it is possible to suppress discoloration of silver or a silver alloy forming the light reflective layer B.

Although the protective layer D formed from the polyolefin based resin is deteriorated while forming radicals by absorbing ultraviolet rays on the side of its surface disposed away from the light reflective layer B, the generated radicals do not reach the light reflective layer B because the protective layer D has a thickness of 300 nm or more. Also, although the protective layer D is deteriorated while forming radicals, the progress of deterioration is slow due to absorption of ultraviolet rays is low, and therefore, the protective layer D exhibits the above-described blocking function for a long period of time.

In the case where the protective layer D is formed from an ethylene terephthalate resin with a thickness of 17 µm or more and 40 µm or less, the ethylene terephthalate resin is a synthetic resin that has a higher absorptivity for ultraviolet rays than the polyolefin based resin in the wavelength range of ultraviolet rays from 0.3 µm to 0.4 µm. However, the protective layer has a thickness of 17 µm or more, and therefore, the protective layer D favorably exhibits the blocking function of blocking radicals generated in the resin material layer J so as not to reach silver or a silver alloy forming the light reflective layer B and blocking moisture that has permeated through the resin material layer J so as not to reach silver or a silver alloy forming the light reflective layer B for a long period of time, and thus it is possible to suppress discoloration of silver or a silver alloy forming the light reflective layer B.

That is, the protective layer D formed from the ethylene terephthalate resin is deteriorated while forming radicals by absorbing ultraviolet rays on the side of its surface disposed away from the light reflective layer B, but the generated radicals do not reach the light reflective layer because the protective layer D has a thickness of 17 μm or more. Also, although the protective layer D is deteriorated while forming radicals, the protective layer D has a thickness of 17 μm or more, and accordingly, exhibits the above-described blocking function for a long period of time.

When described in more detail, the ethylene terephthalate resin (PET) is deteriorated as a result of ester bonds of ethylene glycol and terephthalic acid being cleaved by ultraviolet rays and radicals being formed. This deterioration progresses sequentially from the surface of the ethylene terephthalate resin (PET) irradiated with ultraviolet rays.

For example, when the ethylene terephthalate resin (PET) is irradiated with ultraviolet rays with an intensity equivalent to that in Osaka, ester bonds of the ethylene terephthalate resin (PET) are cleaved sequentially from the irradiated surface by a depth of about 9 nm per day. The ethylene terephthalate resin (PET) has been sufficiently polymerized, and therefore, a surface portion of the ethylene terephthalate resin (PET) where the cleavage has occurred does not damage silver (silver alloy) forming the light reflective layer B, but when a cleaved end of the ethylene terephthalate resin (PET) reaches the silver (silver alloy) forming the light reflective layer B, the silver (silver alloy) is discolored.

Therefore, in order to make the protective layer D durable for a year or longer when used outdoors, the protective layer needs to have a thickness of about 3 μm, which is calculated by adding up 9 nm/day for 365 days. In order to make the protective layer D formed from the ethylene terephthalate resin (PET) durable for three years or longer, the protective layer needs to have a thickness of 10 μm or more. In order to make the protective layer D durable for five years or longer, the protective layer needs to have a thickness of 17 μm or more.

Note that the upper limit value of the thickness of the protective layer D is set for the cases where the protective layer D is formed from the polyolefin based resin or the ethylene terephthalate resin in order to avoid a situation in which the protective layer D exhibits thermal insulation properties, which do not contribute to radiative cooling. That is, as the thickness of the protective layer D is increased, the protective layer D exhibits thermal insulation properties, which do not contribute to radiative cooling, and therefore, the upper limit value of the thickness is set to prevent the protective layer D from exhibiting thermal insulation properties, which do not contribute to radiative cooling, while allowing the protective layer D to exhibit the function of protecting the light reflective layer B.

In the case where the adhesive layer N is disposed between the resin material layer J and the protective layer D as shown in FIG. 18, radicals are generated from the adhesive layer N as well, but it is possible to keep the radicals generated in the adhesive layer N from reaching the light reflective layer B for a long period of time if the thickness of the polyolefin based resin forming the protective layer D is 300 nm or more or the thickness of the ethylene terephthalate resin forming the protective layer D is 17 μm or more.

Note that, when the thickness of the protective layer D is increased, there is no demerit in preventing coloration of silver (silver alloy) forming the light reflective layer B, but there arises a problem in radiative cooling as described above. That is, thermal insulation properties of a radiative cooling material are enhanced when the thickness is increased.

Figure 25:
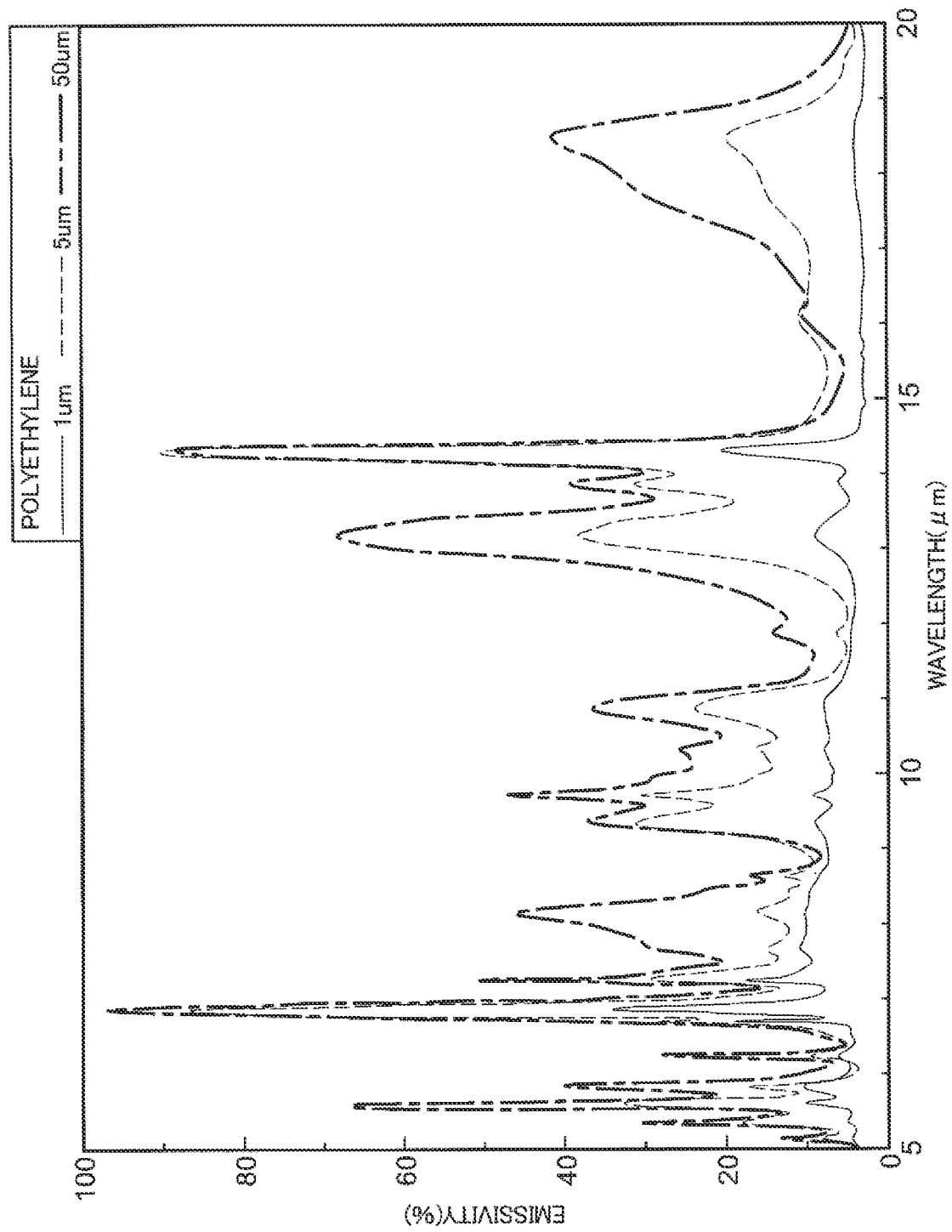
FIG. 25 is a diagram showing an emissivity spectrum of polyethylene.

For example, in the case of a resin that contains polyethylene as a main component and is an excellent synthetic resin for forming the protective layer D, the emissivity in the atmospheric window is small as shown in FIG. 25, and therefore, even if the thickness is increased, the increase does not contribute to radiative cooling.

Conversely, thermal insulation properties of the radiative cooling material are enhanced when the thickness is increased. Next, when the thickness is increased, absorption through vibration of the main chain increases in the near-infrared range, and an effect of increasing absorption of sunlight increases.

For these reasons, a protective layer D having a large thickness is disadvantageous in radiative cooling. From the viewpoints described above, the thickness of the protective layer D formed from the polyolefin resin is preferably 5 μm or less, and more preferably 1 μm or less.

[Consideration on Protective Layer]

Figure 22:
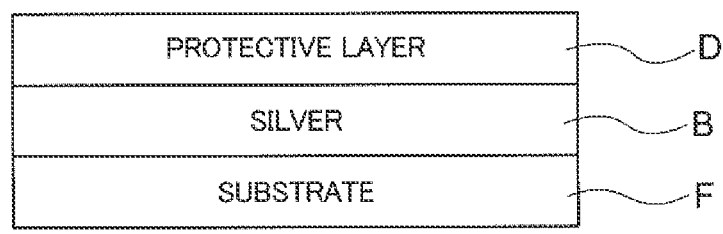
FIG. 22 is a diagram showing a configuration for a test.

In order to examine a difference in coloration of silver according to the protective layer D, samples that did not include the resin material layer J as the infrared radiative layer A and in which the protective layer D was exposed were produced as shown in FIG. 22 and coloration of silver after the samples were irradiated with simulated sunlight was examined.

That is, two types of resins, one of which being a common acrylic resin that absorbs ultraviolet rays (e.g., a methyl methacrylate resin in which a benzotriazole ultraviolet absorbing agent is mixed) and the other being polyethylene, were each applied as the protective layer D to a film layer F (corresponding to a substrate) provided with silver that served as the light reflective layer B, using a bar coater to form the samples, and functions of the resins as the protective layer D were examined. Thicknesses of the applied protective layers D were 10 μm and 1 μm, respectively.

Note that the film layer F (corresponding to a substrate) was formed in a film shape using PET (ethylene terephthalate resin) or the like.

Figure 24:
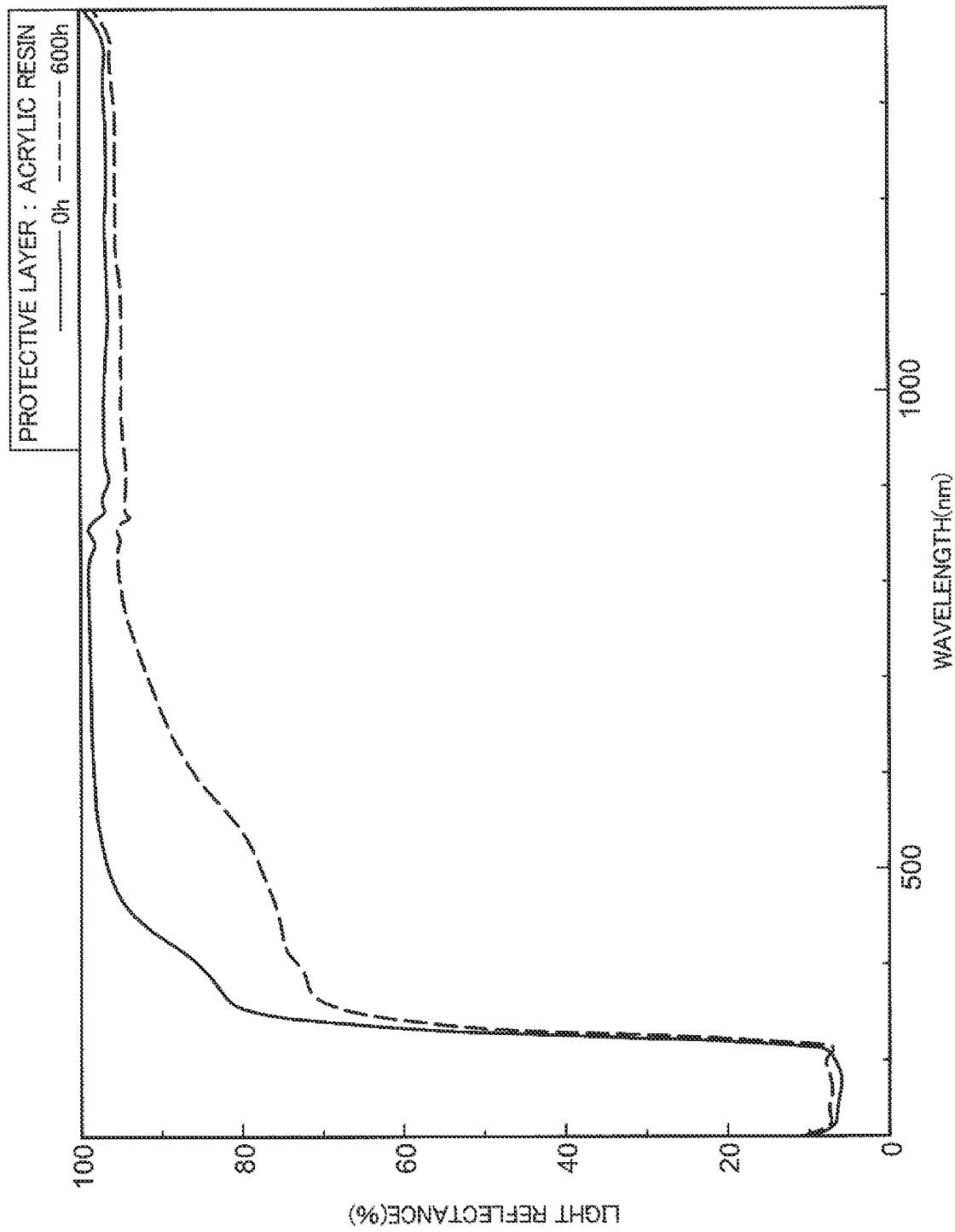
FIG. 24 is a diagram showing a test result of a case where the protective layer is made of an ultraviolet absorbing acrylic resin.

As shown in FIG. 24, in the case where the protective layer D was formed from the acrylic resin that absorbs ultraviolet rays well, the protective layer D was decomposed by ultraviolet rays and formed radicals, silver was immediately discolored to yellow, and the sample failed to operate as the radiative cooling device CP no longer (absorbed sunlight and the temperature increased under solar radiation, as is the case with common materials).

Note that the line denoted by 600h in FIG. 24 shows a reflectance spectrum after a xenon weather test (ultraviolet light energy: 60 W/m$^2$) was performed for 600 h (hours) under the conditions specified in JIS 5600-7-7. Also, the line denoted by 0h shows a reflectance spectrum before the xenon weather test was performed.

Figure 23:
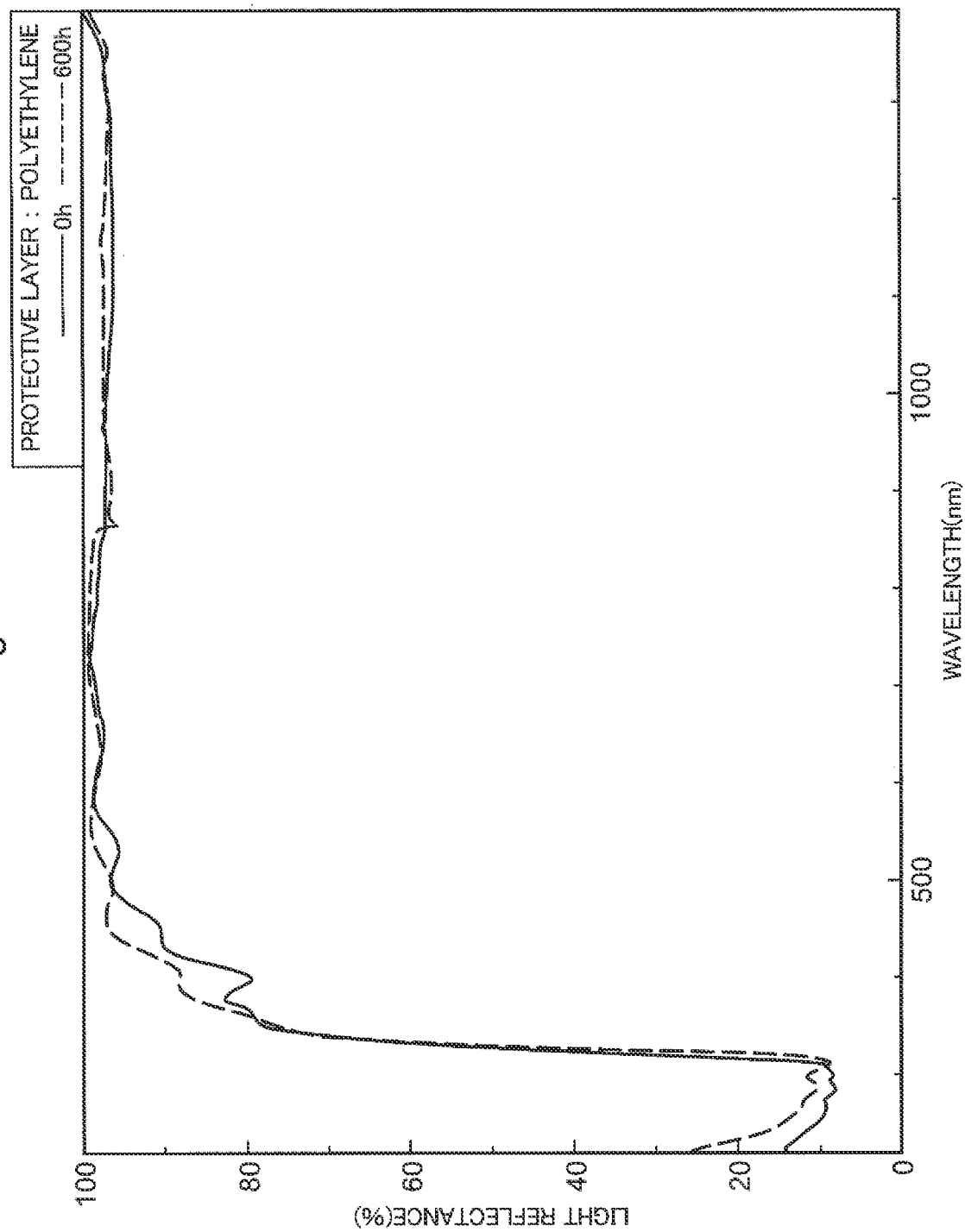
FIG. 23 is a diagram showing a test result of a case where a protective layer is made of polyethylene.

As shown in FIG. 23, in the case where the protective layer D was formed from polyethylene that has a low absorptivity for ultraviolet rays, it can be found that the reflectance did not decrease in the near-infrared range and the visible range. That is, a resin (polyolefin resin) that contains polyethylene as a main component absorbs almost no ultraviolet rays in the sunlight reaching the ground, and accordingly, is unlikely to form radicals even when irradiated with sunlight. Therefore, silver forming the light reflective layer B is not colored even under solar radiation.

Note that the line denoted by 600h in FIG. 23 shows a reflectance spectrum after a xenon weather test (ultraviolet light energy: 60 W/m$^2$) was performed for 600 h (hours) under the conditions specified in JIS 5600-7-7. Also, the line denoted by 0h shows a reflectance spectrum before the xenon weather test was performed.

Note that the reflectance spectrums in this wavelength range wave because of Fabry-Pérot resonance of the polyethylene layer. It can be found that positions of the resonance slightly differ between the line denoted by 0h and the line denoted by 600h due to the thickness of the polyethylene layer being changed by heat applied during the xenon weather test, for example, but no significant decrease in the reflectance due to discoloration of silver to yellow is observed in the ultraviolet-visible range.

Note that a fluorocarbon resin can also be used as a material for forming the protective layer D from the viewpoint of ultraviolet absorption, but when the protective layer D is actually formed from a fluorocarbon resin, the fluorocarbon resin is colored and deteriorated while the protective layer D is formed. Therefore, the fluorocarbon resin cannot be used as a material for forming the protective layer D.

Also, silicone can be used as a material for forming the protective layer D from the viewpoint of ultraviolet absorption, but adhesion between silicone and silver (silver alloy) is very bad, and therefore, silicone cannot be used as a material for forming the protective layer D.

[Another Configuration of Radiative Cooling Device]

Figure 26:
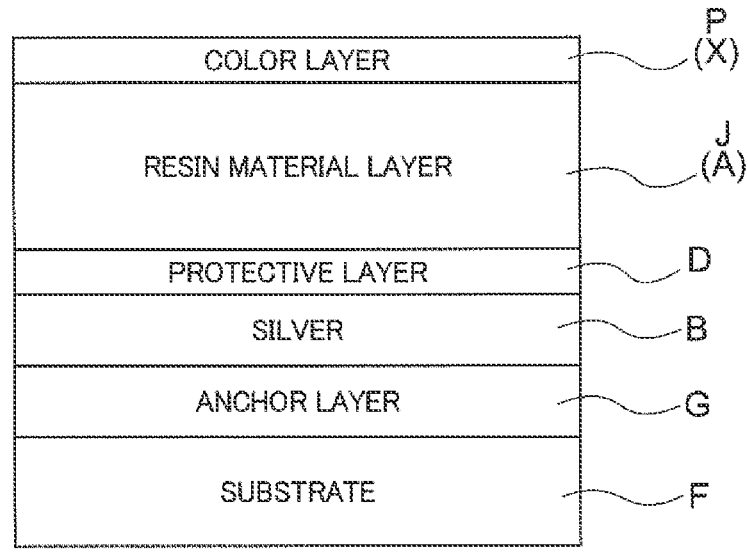
FIG. 26 is a diagram showing another configuration of the radiative cooling device.

As shown in FIG. 26, a configuration is also possible in which an anchor layer G is provided on a film layer F (corresponding to a substrate) and the light reflective layer B, the protective layer D, and the infrared radiative layer A are formed on the anchor layer G.

Note that the film layer F (corresponding to a substrate) is formed in a film shape using PET (ethylene terephthalate resin) or the like.

The anchor layer G is introduced to strengthen adhesion between the film layer F and the light reflective layer B. That is, when a silver (Ag) layer is directly formed on the film layer F, the silver layer is easily peeled off. It is desirable that the anchor layer G contains an acrylic resin, a polyolefin, or urethane as a main component and a compound that has an isocyanate group or a melamine resin is mixed therein. The anchor layer is a coating applied to a portion that is not directly irradiated with sunlight, and may be a constituted by a material that absorbs ultraviolet rays.

Note that adhesion between the film layer F and the light reflective layer B can be strengthened using a method other than the method of introducing the anchor layer G. For example, adhesion is strengthened when the surface of the film layer F, on which another layer is to be formed, is roughened by being irradiated with plasma.

[Another Configuration of Infrared Radiative Layer]

Figure 27:
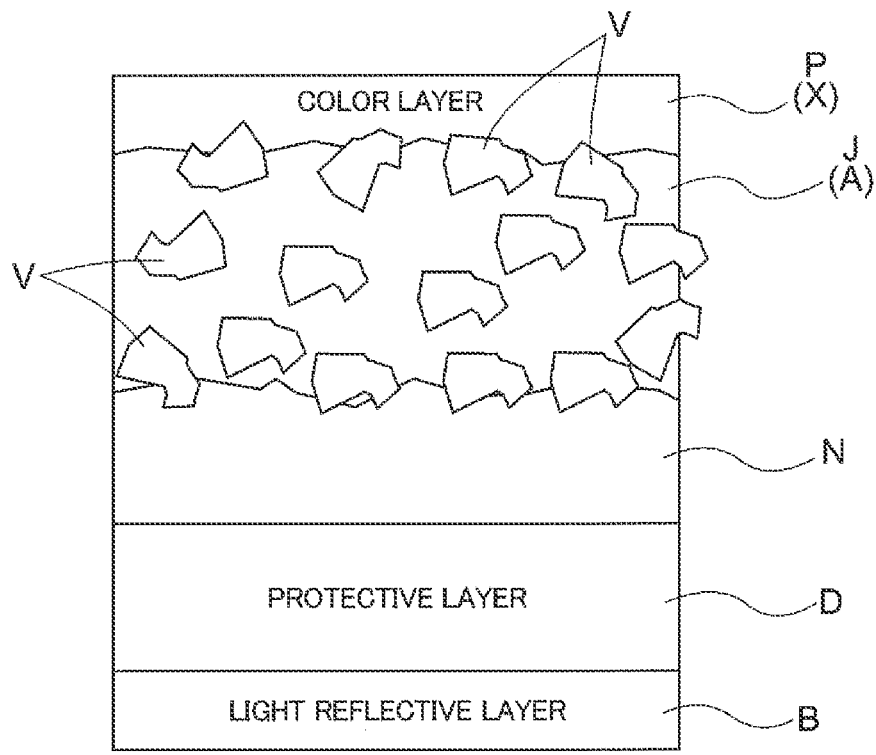
FIG. 27 is a diagram showing a configuration in which a filler is mixed in a resin material layer.
Figure 28:
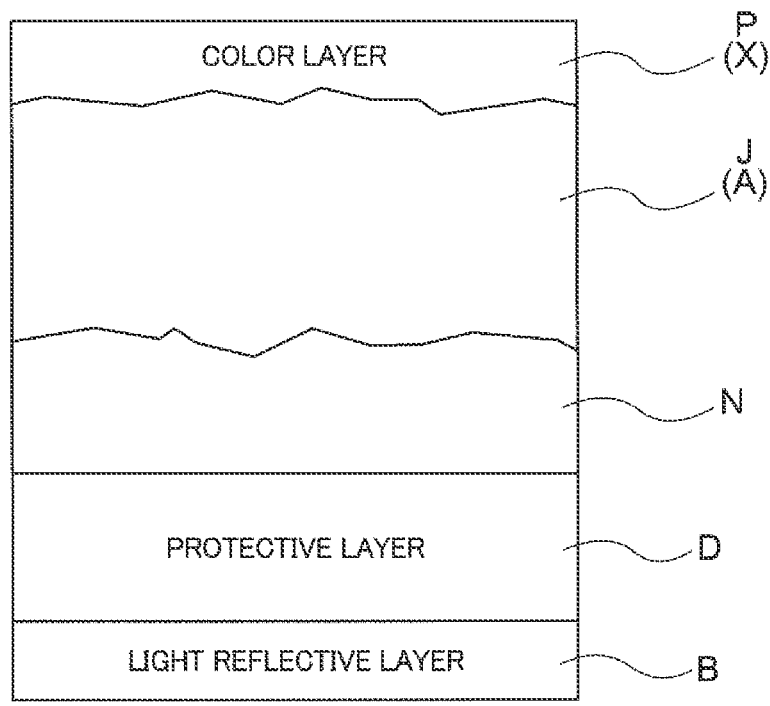
FIG. 28 is a diagram showing a configuration in which irregularities are formed on front and rear surfaces of the resin material layer.

As shown in FIG. 27, a filler V constituted by an inorganic material may be mixed in the resin material layer J constituting the infrared radiative layer A to provide a light scattering configuration. Alternatively, irregularities may be formed on front and rear surfaces of the resin material layer J constituting the infrared radiative layer A as shown in FIG. 28 to provide a light scattering configuration.

With these configurations, it is possible to suppress a glare on the radiative surface H when the radiative surface H is seen.

That is, front and rear surfaces of the resin material layer J described above are both flat and a filler V is not mixed in the resin material layer J. In this case, the radiative surface H is a mirror surface and there is a glare when the radiative surface H is seen, but the glare can be suppressed with the light scattering configurations. As a result, it becomes easier to see the color of the color layer P.

In the case where the filler V is mixed in the resin material layer J, the light reflectance is improved when there are the protective layer D and the light reflective layer B, compared with a case where there is only the resin material layer J in which the filler V is mixed or there is only the light reflective layer B.

As the inorganic material constituting the filler V, silicon dioxide ($SiO_2$), titanium oxide ($TiO_2$), aluminum oxide ($Al_2O_3$), magnesium oxide (MgO), and the like can be preferably used. When the filler V is mixed in the resin material layer J, irregularities are formed on both of the front and rear surfaces of the resin material layer J.

Alternatively, irregularities can be formed on both of the front and rear surfaces of the resin material layer J through embossing processing or processing for scarring the surfaces, for example.

In the case where the rear surface of the resin material layer J has irregularities, it is desirable to dispose an adhesive layer N (joining layer) between the resin material layer J and the protective layer D as in the configuration shown in FIG. 18.

That is, when the adhesive layer N (joining layer) is disposed between the resin material layer J and the protective layer D, the resin material layer J and the protective layer D can be joined appropriately even if the rear surface of the resin material layer J has irregularities.

In the case where the rear surface of the resin material layer J has irregularities, it is also possible to directly join the resin material layer J and the protective layer D through plasma bonding, for example. Plasma bonding is a method of forming radicals by emitting plasma toward surfaces of the resin material layer J and the protective layer D to be joined together and joining the surfaces using the radicals.

When the filler V is mixed in the protective layer D, irregularities are formed on the rear surface of the protective layer D that comes into contact with the light reflective layer B, and consequently irregularities are formed on the surface of the light reflective layer B, and therefore, the filler V needs to be kept from being mixed in the protective layer D. That is, when irregularities are formed on the surface of the light reflective layer B, the light reflective layer B cannot reflect light appropriately, and consequently, radiative cooling cannot be performed appropriately.

In this regard, an experimental result will be described based on FIG. 29.

Figure 29:
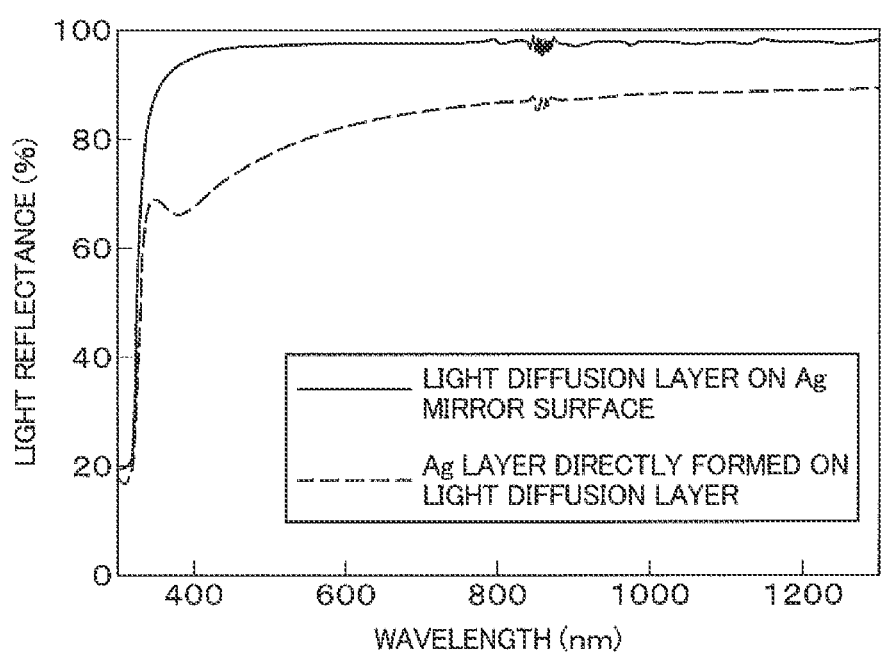
FIG. 29 is a graph showing an experimental result.

In FIG. 29, "Ag layer directly formed on light diffusion layer" means that the light reflective layer B was formed from silver (Ag) through vapor deposition or the like on a surface of the infrared radiative layer A (resin material layer J) in which a filler V was mixed or irregularities were formed through embossing processing on a surface facing the Ag layer, i.e., the light reflective layer B.

Also, "light diffusion layer on Ag mirror surface" means that the upper surface of the Ag layer, i.e., the light reflective layer B, was formed into a mirror surface, and the protective layer D and the infrared radiative layer A (resin material layer J) in which a filler V was mixed or irregularities were formed through embossing processing were stacked on the Ag layer.

As shown in FIG. 29, in the case of "Ag layer directly formed on light diffusion layer", irregularities were formed on a surface of the light reflective layer B, and therefore, the light reflectance significantly decreased, but in the case of "light diffusion layer on Ag mirror surface", the mirror surface of the light reflective layer B was maintained and an appropriate reflectance was obtained.

[Color Layer (Color portion)]

In the present embodiment, the radiative cooling device CP includes the color layer P, which serves as the color portion X. As shown in FIG. 1, the color layer P is a layer and is disposed on the same side as the radiative surface H with respect to the infrared radiative layer A.

A color layer P that has a thickness of 20 μm or less does not hinder action of the radiative cooling device CP (incidence of light, reflection of light, radiation of light, etc.), and thus is preferable. The thickness of the color layer P is particularly preferably 10 μm or less.

The color layer P contains a colorant that absorbs light in the visible range. It is possible to use, as the colorant, an azo compound, a quinone compound, a triarylmethane compound, a cyanine compound, a phthalocyanine compound, an indigo compound, or a porphyrin compound. The colorant may be a dye or a pigment. The colorant may be a non-fluorescent colorant or a fluorescent colorant.

The color layer P can be formed by being printed on the radiative surface H of the resin material layer J using an ink that contains the above-described colorant, a solvent, a binder resin, an additive, and the like. Examples of printing methods that can be used include ink jet printing, screen printing, gravure coating, bar coating, knife coating, roll coating, blade coating, die coating, and laser printing.

After the color layer P is formed through printing using the ink, the colorant and the binder resin remain. Examples of resins that can be used as the binder resin include an acrylic resin (block copolymer), a maleic acid resin, rosin, an epoxy resin, a silicone resin, and a polyvinyl butyral resin (PVB). When a material that can be used for the resin material layer J described above is used as the binder resin, cooling through heat radiation can be performed in the color layer P as well, which is preferable.

[Experiment and Consideration on Light Absorption by Color Layer]

Figure 30:
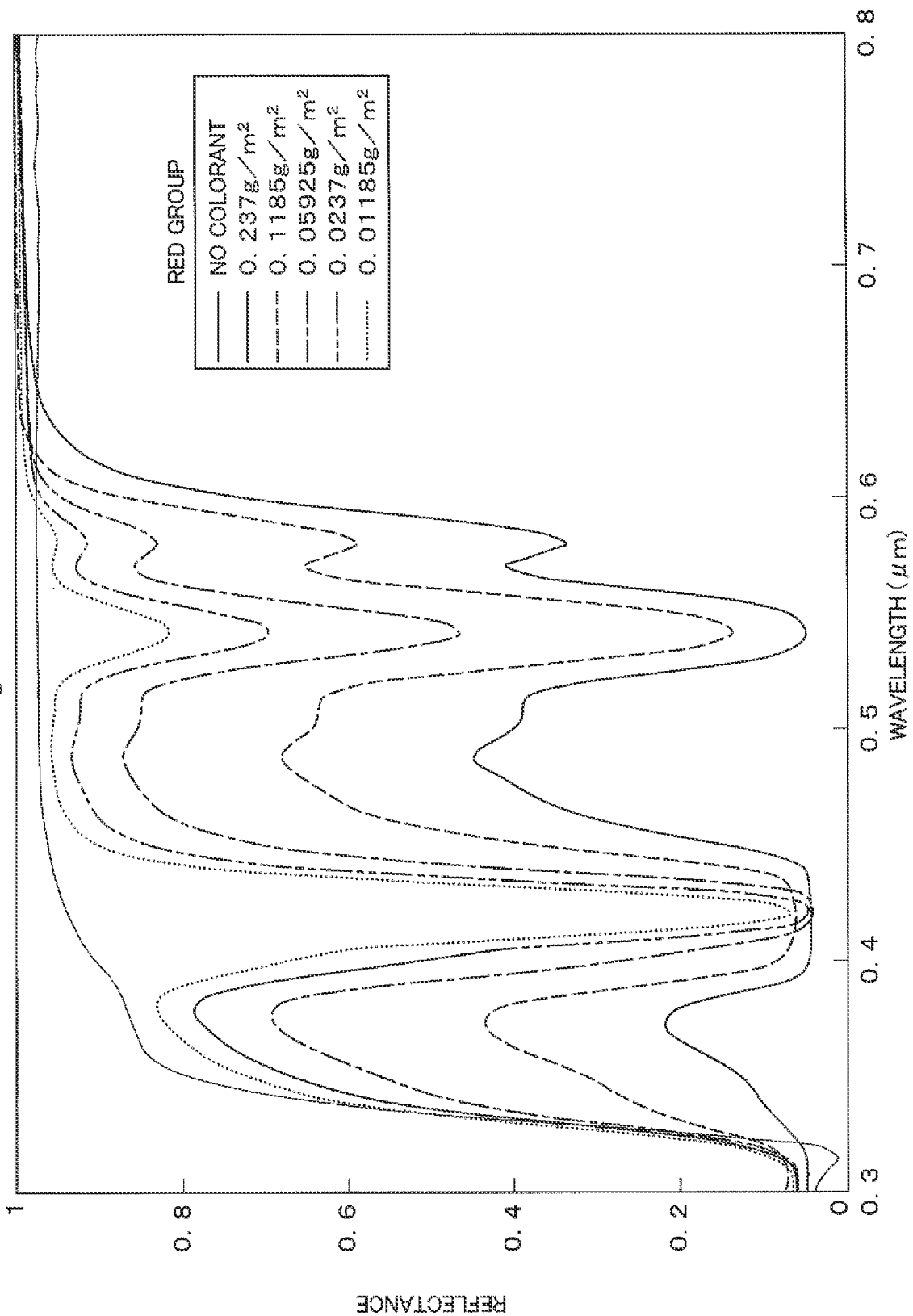
FIG. 30 is a diagram showing absorptivity spectrums of red group measurement samples.
Figure 31:
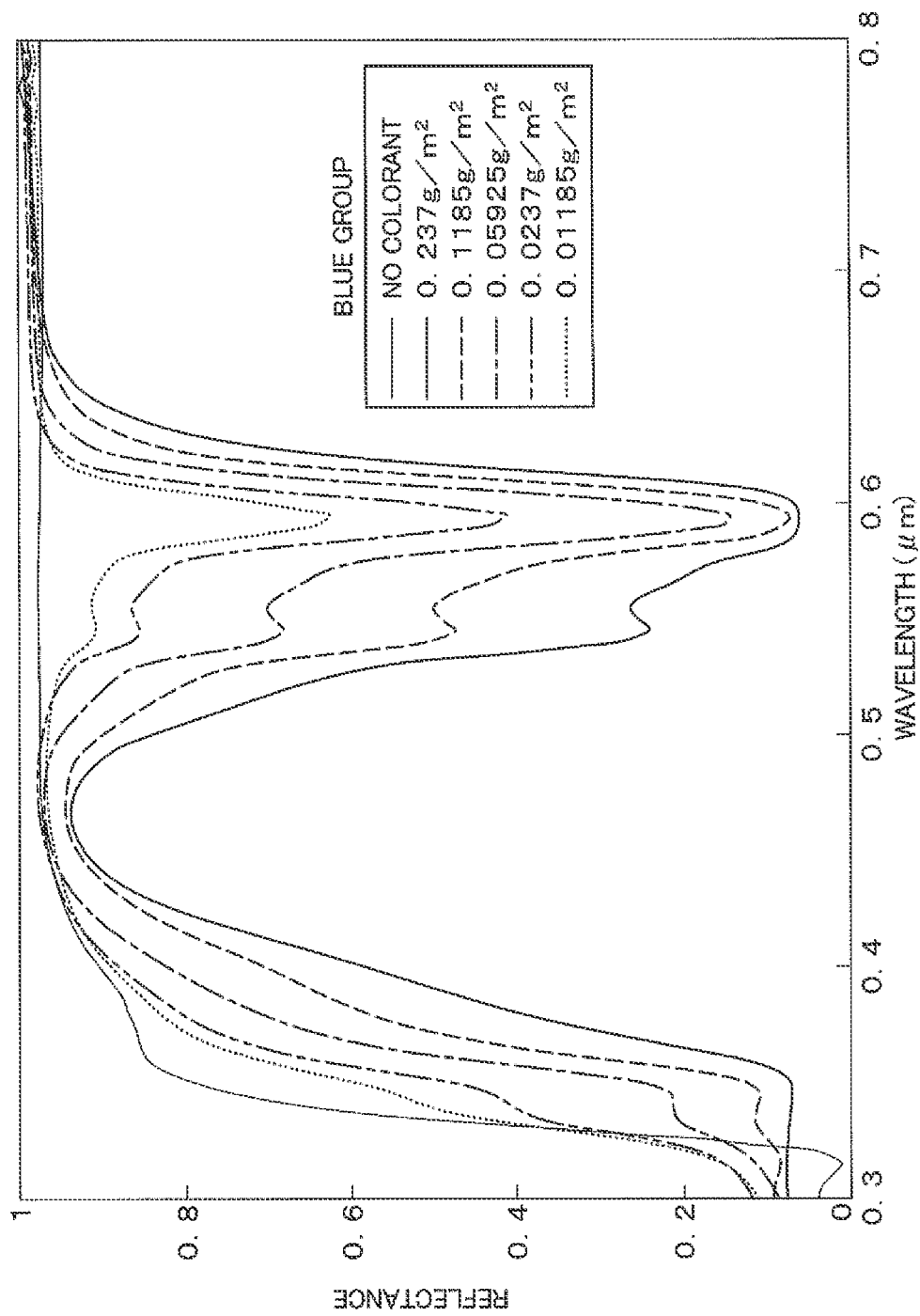
FIG. 31 is a diagram showing absorptivity spectrums of blue group measurement samples.

An acrylic resin layer in which a porphyrin compound was dispersed as a colorant was formed with a thickness of 10 μm to simulate the color layer P, and a reflectance spectrum was measured. FDB-001 (a copper porphyrin complex, hereinafter referred to as a "red group") manufactured by Yamada Chemical Co., Ltd., which has a red color, and FFDG-007 (a copper tetraaza porphyrin complex, hereinafter referred to as a "blue group") manufactured by Yamada Chemical Co., Ltd., which has a blue color, were used as two types of colorants. For each of the red group and the blue group, six measurement samples were prepared by changing the amount of the colorant (hereinafter referred to as the "concentration" or the "colorant content") per unit area of the acrylic resin layer. Colorant contents in the respective measurement samples were 0.0 g/m² (no colorant), 0.237 g/m², 0.1185 g/m², 0.05925 g/m², 0.0237 g/m², and 0.01185 g/m². FIG. 30 shows results of the red group. FIG. 31 shows results of the blue group. In all of the spectrums, the depth of an absorption peak increases (the reflectance decreases) as the concentration of the colorant increases.

Energies absorbed by the acrylic resin layers under solar radiation at the time of meridian transit were calculated based on the results shown in FIGS. 30 and 31. Table 1 shows results. For both of the red group and the blue group, the absorbed energy increases as the colorant content increases.

TABLE 1

| Colorant content (g/m²) | Absorbed energy: Red group (W/m²) | Absorbed energy: Blue group (W/m²) |
| --- | --- | --- |
| 0.237 | 230 | 151 |
| 0.1185 | 154 | 110 |
| 0.05925 | 88.0 | 68.8 |
| 0.0237 | 49.7 | 27.9 |
| 0.01185 | 29.0 | 21.1 |

Here, a heat balance (cooling capability) of cases where the color layer P is provided in the radiative cooling device CP will be considered. In a case where the color layer P is not provided, cooling capability of a standard radiative cooling device CP (the infrared radiative layer A: a vinyl chloride resin with a thickness of 40 μm, the adhesive layer N: polyurethane with a thickness of 10 μm, the protective layer D: a PET resin with a thickness of 25 μm, and the light reflective layer B: silver) is about 100 W/m² on a dry sunny day and is about 80 W/m² in a humid environment.

When the colorant content is 0.1185 g/m² or more, the absorbed energy exceeds the cooling capability of the radiative cooling device CP that is not provided with the color layer P, in both cases of the red group and the blue group. Accordingly, when a color layer P that has a colorant content of 0.1185 g/m² or more is provided in the radiative cooling device CP, the cooling capability is hindered.

On the other hand, when the colorant content is 0.05925 g/m² or less, the absorbed energy is lower than the cooling capability of the radiative cooling device CP that is not provided with the color layer P, in both cases of the red group and the blue group.

Accordingly, when a color layer P that has a colorant content of 0.05925 g/m² or less is provided in the radiative cooling device CP, the cooling capability is not hindered and the cooling target E can be cooled appropriately.

Based on the above results, the colorant content in the color layer P (color portion X) is preferably less than 0.1185 g/m², and more preferably 0.05925 g/m² or less.

[Color Depth of Color Layer]

There are cases where the color layer P (color portion X) is required to have a deep color from the viewpoint of improving the design of the radiative surface H. In order to obtain a deep color, it is preferable to combine a plurality of colorants that desirably have unimodal absorption spectrums in the visible range. Even when the color portion X is colored to black, if a combination of such colorants that selectively absorb only light in the visible range is used, absorption of solar energy can be minimized, which is preferable. When the black color is produced using such colorants that selectively absorb light, the absorptivity for sunlight can be suppressed to about 40%.

The black color absorbs light the most, and accordingly, when colorants that selectively absorb only visible light are used, the amount of energy absorbed by the color layer P from sunlight at the time of meridian transit is about 400 W/m². If such a color layer P is provided over the entire radiative surface H, the energy absorbed by the color layer P from sunlight exceeds cooling capability of the radiative cooling device CP, which is about 100 W/m² at the time of meridian transit. Here, if the color layer P is provided so as to cover a portion of the radiative surface H such that an area ratio of the color layer P to the entire radiative surface H is 25% or less, the amount of energy absorbed by the color layer P from sunlight also becomes 25%, i.e., about 100 W/m². In this case, cooling capability of the radiative cooling device CP is higher than the energy absorbed by the color layer P from sunlight, and therefore, the cooling target E can be cooled. Note that, as well as an uncovered portion of the infrared radiative layer A, the portion of the infrared radiative layer A covered by the color layer P also radiates heat of 100 W/m$^2$.

Another example will be described. When a color layer P that contains the blue group colorant described above at a concentration of 0.237 g/m$^2$ is provided over the entire radiative surface H, the amount of energy absorbed from sunlight is 151 W/m$^2$ and exceeds the cooling capability of 100 W/m$^2$. Here, if the area ratio of the color layer P to the entire radiative surface H is reduced to about 65%, the amount of energy absorbed by the color layer P from sunlight becomes lower than the cooling capability of 100 W/m$^2$, and the cooling target E can be cooled. As described above, when the area ratio of the color layer P to the entire radiative surface H is reduced, it is possible to increase the concentration of the colorant contained in the color layer P (color portion X) to increase the depth of the color. Note that the "concentration" referred to here is not an amount of the colorant per unit area calculated for the entire radiative surface H, but is an amount of the colorant per unit area calculated for the color portion X, and is a local concentration of the colorant contained in the color portion X.

OTHER EMBODIMENTS

Other embodiments will be listed below.
(1) In the above embodiment, the color layer P, which serves as the color portion X, is disposed on the same side as the radiative surface H with respect to the infrared radiative layer A. The color layer P is formed on the upper side of the resin material layer J as shown in FIG. 18, for example. Other configurations of the color portion X described below may also be adopted.

Figure 33:
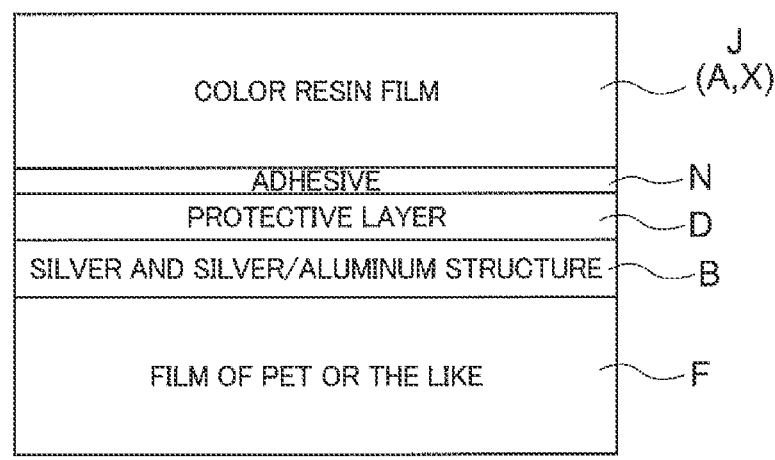
FIG. 33 is a diagram showing a specific configuration of the radiative cooling device.

For example, as shown in FIG. 33, the color portion X may be the resin material layer J (color resin film J). In this embodiment, the resin material layer J contains the colorant described above.

Figure 34:
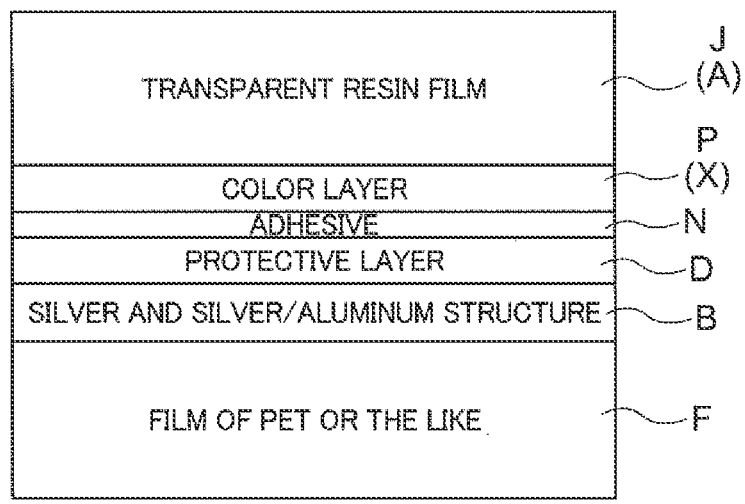
FIG. 34 is a diagram showing a specific configuration of the radiative cooling device.

As shown in FIG. 34, for example, the color layer P may be provided between the resin material layer J and an adhesive layer N.

Figure 35:
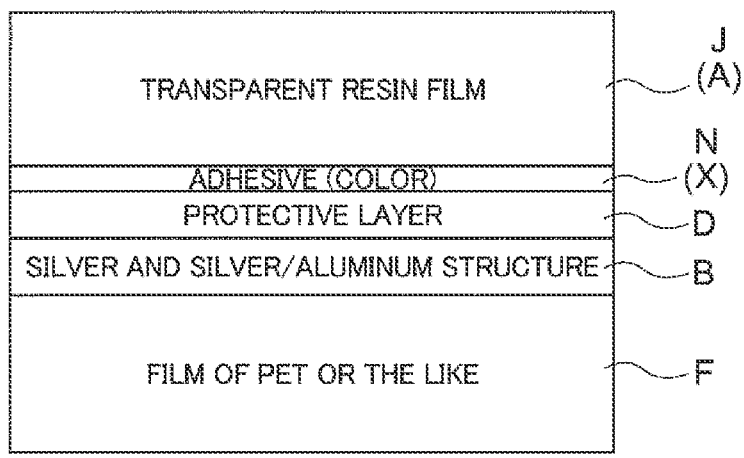
FIG. 35 is a diagram showing a specific configuration of the radiative cooling device.

As shown in FIG. 35, for example, the color portion X may be an adhesive layer N. In this embodiment, the adhesive layer N contains the colorant described above.

Figure 36:
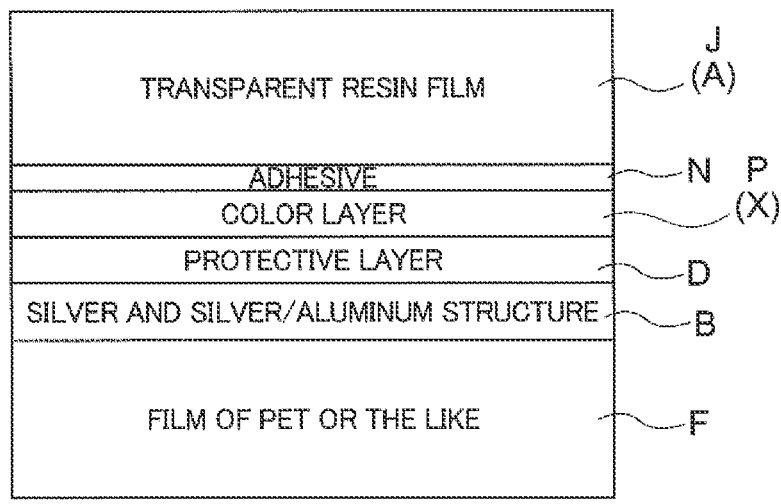
FIG. 36 is a diagram showing a specific configuration of the radiative cooling device.

As shown in FIG. 36, for example, the color layer P may be provided between an adhesive layer N and the protective layer D.

The color portion X may be provided over the entire radiative surface H of the resin material layer J as shown in FIG. 1 or in portions of the radiative surface H of the resin material layer J as shown in FIG. 32. When the color layer P is provided as in the embodiments shown in FIGS. 1, 34, and 36, the color layer P may be provided over the entire radiative surface H or in portions of the radiative surface H.

When the resin material layer J or the adhesive layer N is the color portion X as in the embodiments shown in FIGS. 33 and 35, the entire layer (resin material layer J or adhesive layer N) may be the color portion X.

That is, the colorant may be contained in the entire layer. Alternatively, a portion of the layer (a portion in an extending direction of the radiative surface H or a portion in the thickness direction of the layer) may be the color portion X. That is, the colorant may be contained in the portion of the layer. In other words, the layer may be constituted by a layer material that contains the colorant and a layer material that does not contain the colorant.

(2) In the above embodiment, various resin materials are described as examples of the resin material forming the resin material layer J, but examples of resin materials that can be preferably used include a vinyl chloride resin (PVC), a vinylidene chloride resin (PVDC), a vinyl fluoride resin (PVF), and a vinylidene fluoride resin (PVDF).

(3) In the above embodiment, an object that is in close contact with the rear surface of the radiative cooling device CP (radiative cooling film) is described as an example of the cooling target E, but the radiative cooling device CP is applicable to various cooling targets E such as a space to be cooled.

Figure 37:
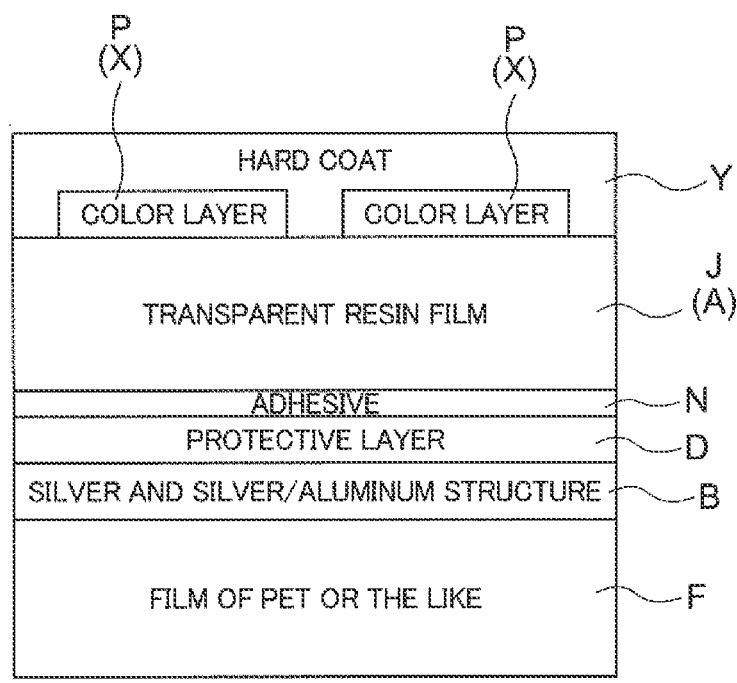
FIG. 37 is a diagram showing a specific configuration of the radiative cooling device.

(4) In the above embodiment, configurations in which the radiative surface H of the resin material layer J is exposed are described as examples. As shown in FIG. 37, it is also possible to provide a hard coat layer Y that covers the radiative surface H and the color layer P.

Examples of materials of the hard coat layer Y include a UV-curable acrylic material, a thermosetting acrylic material, a UV-curable silicone material, a thermosetting silicone material, an organic-inorganic hybrid material, and vinyl chloride, and any of these may be used. An organic antistatic agent may also be used as an additive.

Among UV-curable acrylic materials, urethane acrylate is particularly preferable.

The hard coat layer Y can be formed through gravure coating, bar coating, knife coating, roll coating, blade coating, die coating, or the like.

The thickness of the hard coat (coating layer) is 1 to 50 μm, and particularly preferably 2 to 20 μm.

In a case where a vinyl chloride resin is used as the resin material of the resin material layer J, the amount of a plasticizer for the vinyl chloride resin may be reduced to obtain a rigid vinyl chloride resin or a semi-rigid vinyl chloride resin. In this case, the vinyl chloride of the infrared radiative layer A itself serves as the hard coat layer Y.

The protective layer D may be formed from an acrylic resin. Preferably, the protective layer D is formed from an acrylic resin that absorbs a relatively small amount of ultraviolet rays. More preferably, the protective layer D is formed from an acrylic resin that does not contain an ultraviolet absorbing agent.

The configurations disclosed in the above embodiments (including the other embodiments, the same applies hereinafter) can be applied in combination with configurations disclosed in other embodiments. Also, the embodiments disclosed in the present specification are examples, and embodiments of the present invention are not limited to the disclosed embodiments, and can be modified as appropriate within a range not deviating from the object of the present invention.

DESCRIPTION OF REFERENCE SIGNS

A: infrared radiative layer
B: light reflective layer
D: protective layer
H: radiative surface
J: resin material layer
N: adhesive layer (joining layer)
P: color layer
X: color portion
Y: hard coat layer

The invention claimed is:
1. A radiative cooling device comprising:
an infrared radiative layer configured to radiate infrared light from a radiative surface;

a light reflective layer disposed on a side opposite to the radiative surface with respect to the infrared radiative layer; and a color portion, wherein the infrared radiative layer is a resin material layer that has a thickness adjusted so as to emit a heat radiation energy greater than an absorbed solar energy in a wavelength range from 8 μm to 14 μm, and wherein the color portion contains a colorant that absorbs light in the visible range.

2. The radiative cooling device according to claim 1, wherein the colorant has an absorption peak of visible light in a wavelength range from 350 nm to 850 nm.

3. The radiative cooling device according to claim 1, wherein a resin material forming the resin material layer is selected from resin materials that have any one or two or more of a carbon-fluorine bond, a siloxane bond, a carbon-chlorine bond, a carbon-oxygen bond, an ether bond, an ester bond, and a benzene ring.

4. The radiative cooling device according to claim 1, wherein a resin material forming the resin material layer contains at least one selected from a vinyl chloride resin, a vinylidene chloride resin, polyvinyl fluoride, polyvinylidene fluoride, a polymethyl methacrylate resin, a resin that contains siloxane as a main component, a fluorocarbon resin, silicone rubber, and a silicone resin.

5. The radiative cooling device according to claim 1, wherein the light reflective layer is silver or a silver alloy.

6. The radiative cooling device according to claim 1, further comprising:

a protective layer that is disposed between the resin material layer and the light reflective layer, and wherein the protective layer comprises at least one of a polyolefin based resin, an ethylene terephthalate resin, and an acrylic resin.

7. The radiative cooling device according to claim 6, further comprising:

a joining layer that joins the protective layer and the resin material layer, and wherein the joining layer comprises at least one of a urethane resin, an acrylic resin, and an ethylene vinyl acetate resin.

8. The radiative cooling device according to claim 7, wherein the color portion constitutes a portion of the joining layer or the entire joining layer.

9. The radiative cooling device according to claim 7, wherein the color portion is a layer that is provided between the joining layer and the protective layer or between the joining layer and the resin material layer.

10. The radiative cooling device according to claim 1, wherein the color portion is a layer that is disposed on the same side as the radiative surface with respect to the infrared radiative layer.

11. The radiative cooling device according to claim 1, wherein the color portion constitutes a portion of the infrared radiative layer or the entire infrared radiative layer.

12. The radiative cooling device according to claim 1, wherein the colorant contains at least one selected from an azo compound, a quinone compound, a triarylmethane compound, a cyanine compound, a phthalocyanine compound, an indigo compound, and a porphyrin compound.

13. The radiative cooling device according to claim 1, wherein a colorant content that is a value calculated by dividing a total amount of the colorant contained in the color portion by an area of the entire radiative surface is less than 0.1185 g/m$^2$.

14. The radiative cooling device according to claim 1, further comprising:

a hard coat layer at an outermost position on a side opposite to the light reflective layer with respect to the infrared radiative layer.

15. The radiative cooling device according to claim 14, wherein the hard coat layer comprises an acrylic resin.

16. A cooling method performed using the radiative cooling device according to claim 1, the cooling method comprising:

disposing the radiative cooling device such that the radiative surface of the infrared radiative layer faces the sky; and allowing the radiative surface to radiate infrared light.

* * * * *